US012600308B2

(12) United States Patent
  Uda

(10) Patent No.: US 12,600,308 B2
(45) Date of Patent: Apr. 14, 2026

(54) TILT DETECTION DEVICE, TILT DETECTION SYSTEM, TILT DETECTION METHOD, AND STORAGE MEDIUM FOR STORING TILT DETECTION PROGRAM

(71) Applicant: DENSO CORPORATION, Kariya-city (JP)

(72) Inventor: Nobuhiko Uda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 79 days.

(21) Appl. No.: 18/617,224

(22) Filed: Mar. 26, 2024

(65) Prior Publication Data

US 2024/0239279 A1     Jul. 18, 2024

Related U.S. Application Data

(63) Continuation of application No. PCT/JP2022/032260, filed on Aug. 26, 2022.

(30) Foreign Application Priority Data

Sep. 28, 2021     (JP) ................................. 2021-158059

(51) Int. Cl.
  *B60R 16/023* (2006.01)
  *B60R 1/27* (2022.01)
  *B60R 16/02* (2006.01)
  *G01C 9/00* (2006.01)
  *G01S 17/931* (2020.01)
  *G08G 1/16* (2006.01)

(52) U.S. Cl.
  CPC ............ *B60R 16/0233* (2013.01); *B60R 1/27* (2022.01); *G01S 17/931* (2020.01)

(58) Field of Classification Search
  CPC .................................................. B60R 16/0233
  See application file for complete search history.

(56) References Cited

U.S. PATENT DOCUMENTS 10,099,630 B1     10/2018  Krishnan et al.
11,555,903 B1 *    1/2023  Kroeger .................. G05D 1/024
(Continued)

FOREIGN PATENT DOCUMENTS

JP          H05213150 A  *  8/1993
JP          2006248270 A  *  9/2006  ......... B60R 21/0132
JP          2021056060 A  *  4/2021  ............. G06V 20/64

*Primary Examiner* — Davetta W Goins
*Assistant Examiner* — Pameshanand Mahase
(74) *Attorney, Agent, or Firm* — Precision Patents, P.C.

(57) ABSTRACT

A tilt detection device for a moving object includes the first acquisition portion that acquires first tilt information detected by a first tilt sensor disposed in a sensor package housing mounted in the moving object and a peripheral monitoring sensor. The second acquisition portion acquires second tilt information detected by a second tilt sensor disposed in a portion of the moving object other than the sensor package housing. The first difference identification portion identifies a first difference between a tilt of the moving object relative to a common reference state and a tilt of the sensor package housing relative to the common reference state based on the first tilt information and the second tilt information. The tilt detection portion determines that the sensor package housing is tilted from an initial position when the first difference does not fall within a first allowable range.

17 Claims, 24 Drawing Sheets

(56)　　　　　References Cited

U.S. PATENT DOCUMENTS

| 11,623,494 | B1 * | 4/2023 | Arnicar | ................. | G01S 17/931 |
| | | | | | 701/37 |
| 2021/0097324 | A1 | 4/2021 | Hoashi | | |
| 2021/0109205 | A1 * | 4/2021 | Liao | ...................... | G01S 7/4972 |

\* cited by examiner 4, 403     3     5, 503     4, 404

8

4, 401
5, 501

4, 402     6     5, 502

RESONANCE FREQUENCY 1     RESONANCE FREQUENCY 2     LARGE VIBRATION 3     6          3     6          SMALL VIBRATION

Figure 6:
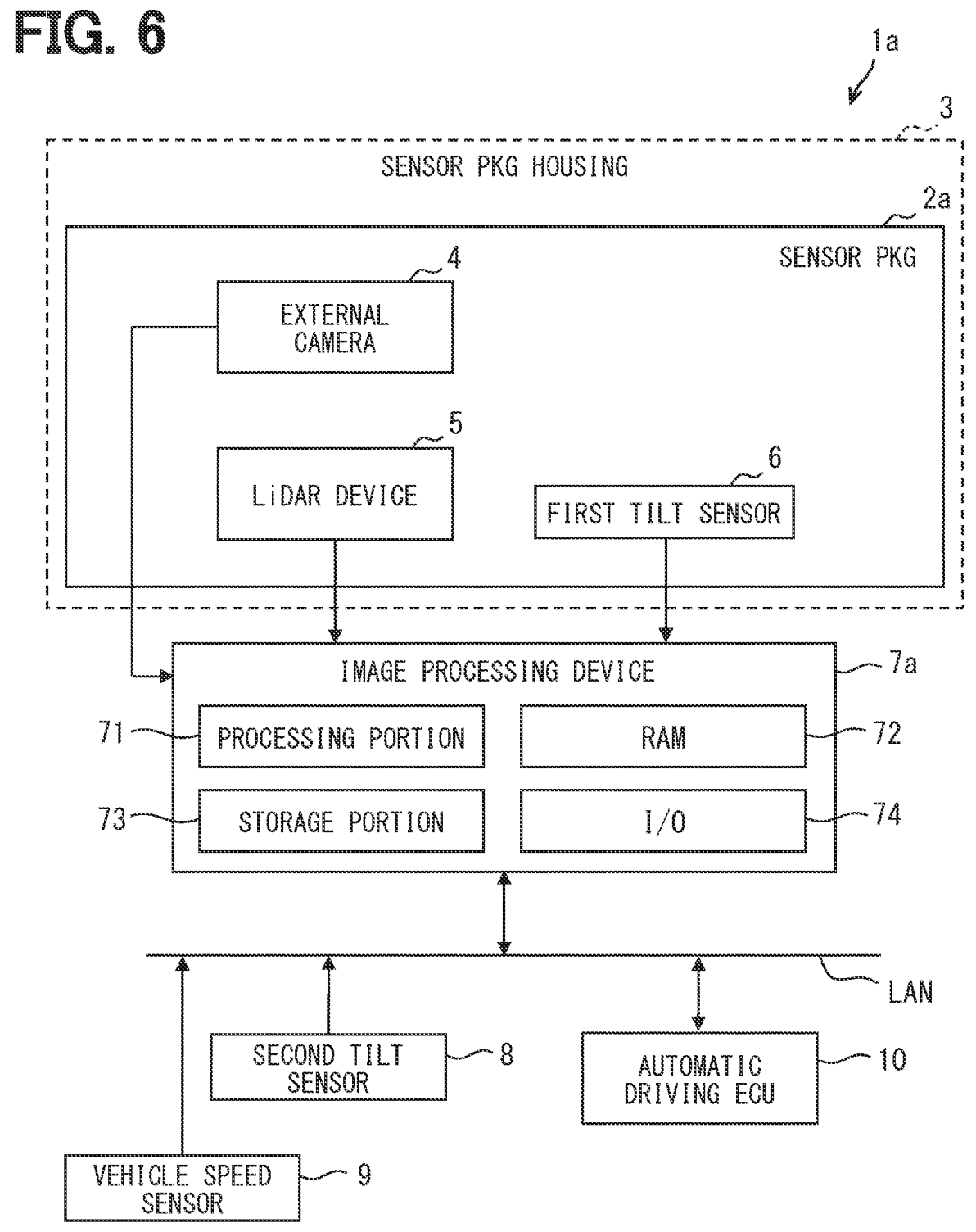

SENSOR PKG HOUSING

2a

SENSOR PKG

4

EXTERNAL CAMERA

5

LiDAR DEVICE

6

FIRST TILT SENSOR

IMAGE PROCESSING DEVICE

7a

71 — PROCESSING PORTION

RAM — 72

73 — STORAGE PORTION

I/O — 74

LAN

SECOND TILT SENSOR — 8

AUTOMATIC DRIVING ECU — 10

VEHICLE SPEED SENSOR — 9

TILT DETECTION DEVICE, TILT DETECTION SYSTEM, TILT DETECTION METHOD, AND STORAGE MEDIUM FOR STORING TILT DETECTION PROGRAM

CROSS REFERENCE TO RELATED APPLICATIONS

This application is a continuation application of International Patent Application No. PCT/JP2022/032260 filed on Aug. 26, 2022, which designated the U.S. and claims the benefit of priority from Japanese Patent Application No. 2021-158059 filed on Sep. 28, 2021. The entire disclosure of all of the above application is incorporated herein by reference.

TECHNICAL FIELD

The present disclosure relates to a tilt detection device, a tilt detection system, a tilt detection method, and a tilt detection program.

BACKGROUND

There has been known technology of a surrounding monitoring sensor used for automatic vehicle driving in the form of a sensor mounting system that includes at least two LiDAR devices and one camera all surrounded by a cover and mounted on the roof of a vehicle.

SUMMARY

According to one aspect of the present disclosure, a tilt detection device for a moving object includes: a first acquisition portion; a second acquisition portion; a first difference identification portion; and a tilt detection portion. The first acquisition portion is configured to acquire first tilt information detected by a first tilt sensor disposed in a sensor package housing that is mounted in the moving object and includes a peripheral monitoring sensor used to monitor surroundings of the moving object. The second acquisition portion is configured to acquire second tilt information detected by a second tilt sensor disposed in a portion of the moving object other than the sensor package housing. The first difference identification portion is configured to identify a first difference between a tilt of the moving object relative to a common reference state and a tilt of the sensor package housing relative to the common reference state based on the first tilt information acquired by the first acquisition portion and the second tilt information acquired by the second acquisition portion. The tilt detection portion is configured to determine that the sensor package housing is tilted from an initial position when the first difference identified by the first difference identification portion does not fall within a first allowable range.

BRIEF DESCRIPTION OF THE DRAWINGS

FIG. 6 is a diagram illustrating a schematic configuration of a vehicle system;

DESCRIPTION OF EMBODIMENTS

Figure 1:
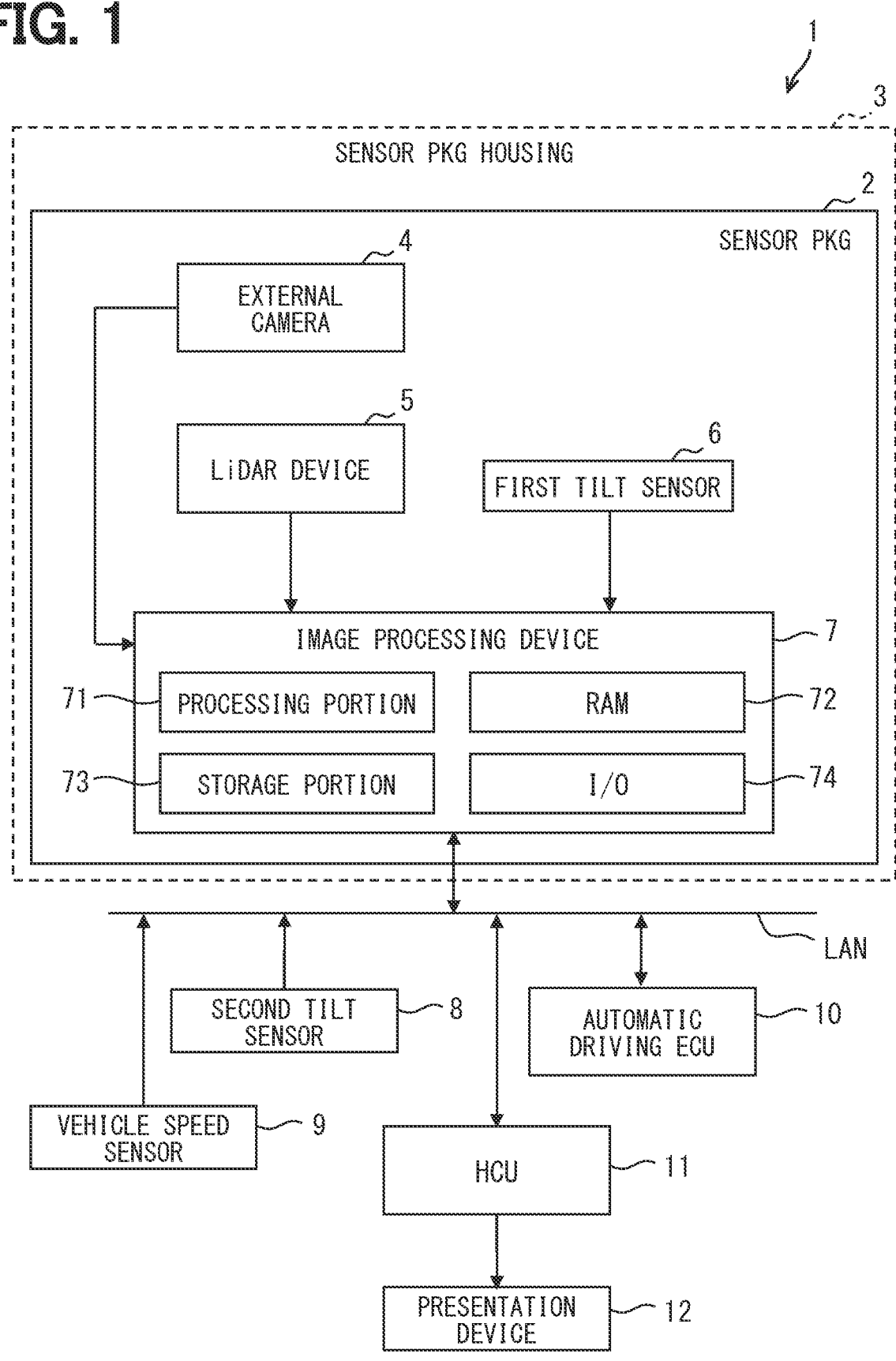
FIG. 1 is a diagram illustrating a schematic configuration of a vehicle system.

Next, a relevant technology will be described first only for understanding the following embodiments. A vehicle may be mounted with a sensor package housing, namely, a housing containing a peripheral monitoring sensor. In this case, the detection axis of the peripheral monitoring sensor is oriented to a desired direction referring to the vehicle or is calibrated to correct a deviation from the desired direction. However, the tilt of the sensor package housing against the vehicle may chronologically change after installation on the vehicle from the initial installation position on the vehicle. A tilt of the sensor package housing may shift the detection axis of the peripheral monitoring sensor from the initial position and may degrade the detection accuracy of the peripheral monitoring sensor.

A conventional technology does not consider detecting a tilt of the sensor package housing against the vehicle from the initial position. It has been difficult to inhibit a decrease in the detection accuracy of the peripheral monitoring sensor due to the tilt of the sensor package housing from the initial position.

It is one of objectives of the disclosure to provide a tilt detection device, a tilt detection system, a tilt detection method, and a tilt detection program capable of more accurately detecting tilts of a sensor package housing from the initial position referring to the sensor package housing mounted on a moving object.

According to a first aspect of the present disclosure, a tilt detection device for a moving object includes: a first acquisition portion; a second acquisition portion; a first difference identification portion; and a tilt detection portion. The first acquisition portion is configured to acquire first tilt information detected by a first tilt sensor disposed in a sensor package housing that is mounted in the moving object and includes a peripheral monitoring sensor used to monitor surroundings of the moving object. The second acquisition portion is configured to acquire second tilt information detected by a second tilt sensor disposed in a portion of the moving object other than the sensor package housing. The first difference identification portion is configured to identify a first difference between a tilt of the moving object relative to a common reference state and a tilt of the sensor package housing relative to the common reference state based on the first tilt information acquired by the first acquisition portion and the second tilt information acquired by the second acquisition portion. The tilt detection portion is configured to determine that the sensor package housing is tilted from an initial position when the first difference identified by the first difference identification portion does not fall within a first allowable range.

According to a second aspect of the present disclosure, a tilt detection method is implemented by at least one processor of a moving object. The method includes: acquiring first tilt information detected by a first tilt sensor disposed in a sensor package housing that is mounted in the moving object and includes a peripheral monitoring sensor used to monitor surroundings of the moving object; acquiring second tilt information detected by a second tilt sensor disposed in a portion of the moving object other than the sensor package housing; identifying a first difference between a tilt of the moving object relative to a common reference state and a tilt of the sensor package housing relative to the common reference state based on the acquired first tilt information and the acquired second tilt information; and determining that the sensor package housing is tilted from an initial position when the identified first difference does not fall within the first allowable range.

According to a third aspect of the present disclosure, a non-transitory, computer readable, tangible storage medium stores a tilt detection program for a moving object. The tilt detection program includes instructions, when executed by at least one processor of the moving object, causing the at least one processor to: acquire first tilt information detected by a first tilt sensor disposed in a sensor package housing that is mounted in the moving object and includes a peripheral monitoring sensor used to monitor surroundings of the moving object; acquire second tilt information detected by a second tilt sensor disposed in a portion of the moving object other than the sensor package housing; identify a first difference between a tilt of the moving object relative to a common reference state and a tilt of the sensor package housing relative to the common reference state based on the acquired first tilt information and the acquired second tilt information; and determine that the sensor package housing is tilted from an initial position when the identified first difference does not fall within the first allowable range.

The first difference signifies a difference between the tilt of the moving object and the tilt of the sensor package housing based on a common reference state. If the first difference falls outside the first tolerance range, the sensor package housing is detected to be tilted from the initial position. The sensor package housing is mounted on a moving object. A first tilt sensor is installed in the sensor package housing. First tilt information detected by the first tilt sensor also includes information on the tilt of the moving object. A second tilt sensor is installed on the moving object other than the sensor package housing. Second tilt information detected by the second tilt sensor provides information on the tilt of the moving object exclusive of the information on the tilt of the sensor package housing itself. The first difference provides the tilt of the sensor package housing itself except for the tilt of the moving object. It is possible to detect a tilt of the sensor package housing from the initial position based on the tilt of the sensor package housing itself except for the tilt of the moving object. As a result, it becomes possible to highly accurately detect a tilt of the sensor package housing, mounted on a moving object, from the initial position.

According to a fourth aspect of the present disclosure, a tilt detection system includes: the tilt detection device, which is usable in the moving object; the sensor package housing that is mounted in the moving object and includes the peripheral monitoring sensor used to monitor surroundings of the moving object; the first tilt sensor that is disposed in the sensor package housing; and the second tilt sensor that is disposed in the portion of the moving object other than the sensor package housing.

Since the above-described tilt detection device is included, it is possible to more accurately detect the tilt of the sensor package housing, mounted on a moving object, from the initial position.

The description below explains embodiments for carrying out the present disclosure by reference to the drawings. The same reference numerals may be given to parts having the same functions illustrated in the drawings used to describe the embodiments hitherto and the related description may be omitted for convenience sake. The parts given the same reference numerals can be made clear by reference to the description in the other embodiments.

Schematic Configuration of the Vehicular System 1

The vehicular system 1 can be used for vehicles. As illustrated in FIG. 1, the vehicular system 1 includes a sensor package (PKG) 2, a second tilt sensor 8, a vehicle speed sensor 9, an automatic driving ECU 10, an HCU (Human Machine Interface Control Unit) 11, and a presentation device 12. The description below explains examples of using the vehicular system 1 for vehicles, specifically, automobiles though the vehicular system 1 is not necessarily limited to automobiles. A vehicle using the vehicular system 1 is hereinafter referred to as a subject vehicle.

As illustrated in FIG. 1, the sensor PKG 2 includes an external camera 4, a LiDAR device 5, a first tilt sensor 6, and an image processing device 7. The external camera 4 captures images in a predetermined range outside the subject vehicle. The external camera 4 is comparable to a peripheral monitoring sensor. The external camera 4 successively outputs successively captured images as sensing information to the image processing device 7. The LiDAR device 5 is an optical sensor that irradiates light onto a predetermined range around the subject vehicle and detects the light reflecting off a target. The LiDAR device 5 is also comparable to a peripheral monitoring sensor. The LiDAR device 5 receives a wave reflecting off the target to generate a reception signal and successively outputs scan results, as sensing information, based on the reception signal to the image processing device 7. The configuration including the sensor PKG 2 and the second tilt sensor 8 is comparable to a tilt detection system.

Figure 2:
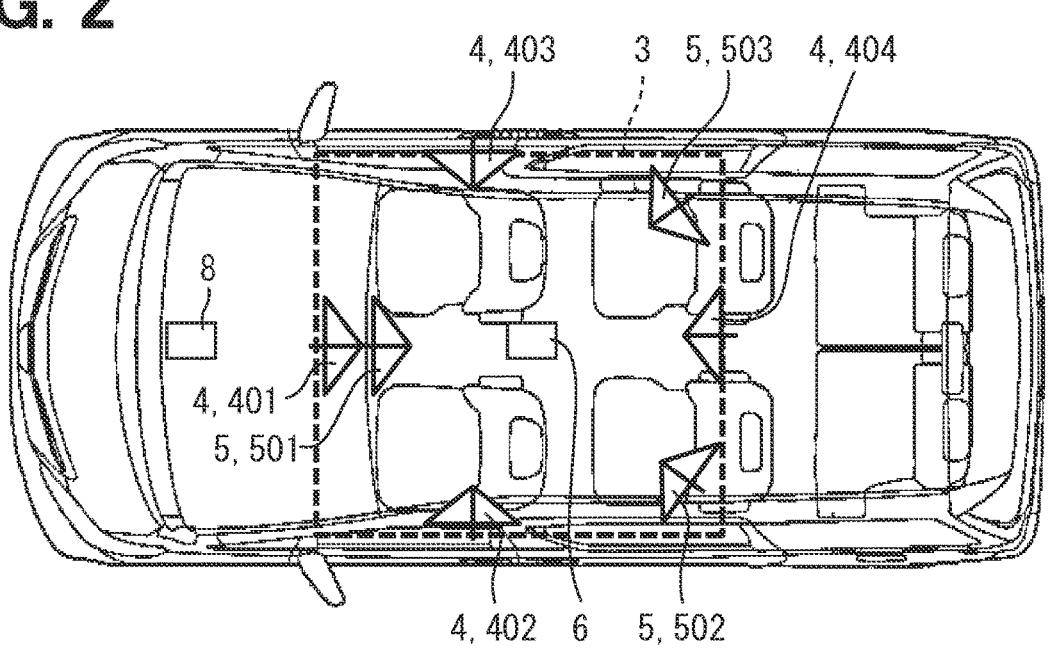
FIG. 2 is a diagram illustrating an arrangement of an external camera, a LiDAR device, a first tilt sensor, and a second tilt sensor according to a first embodiment.

As illustrated in FIG. 1, the sensor PKG 2 is included in a sensor package housing (hereinafter denoted as a sensor PKG housing) 3. The sensor PKG housing 3 may be made of resin or metal, for example. The sensor PKG housing 3 contains the sensor PKG 2 and is mounted on the subject vehicle. As illustrated in FIG. 2, the sensor PKG housing 3 is assumed to be mounted on the roof of the subject vehicle, for example. The sensor PKG housing 3 may be shaped to extend over the roof of the subject vehicle along the top surface of the roof. In the example of the present embodiment, the sensor PKG housing 3 may have a rectangular shape when viewed from the height direction of the subject vehicle. The rectangular shape is not limited to perfect squares but also includes shapes with rounded corners.

The tilt of the sensor PKG housing 3 against the subject vehicle is assumed to be set when the sensor PKG housing 3 is initially attached to the subject vehicle, at the time of factory shipment, for example, so that detection axes of peripheral monitoring sensors such as the external camera 4 and the LiDAR device 5 are oriented in the desired directions referring to the subject vehicle. The tilt of the sensor PKG housing 3 against the subject vehicle at the time of initial installation is comparable to the initial position. The detection axis of the peripheral monitoring sensor may not completely align with the desired direction referring to the subject vehicle at the time of initial installation. Even in such a case, deviations may be previously stored in the image processing device 7 to calibrate the deviations.

The first tilt sensor 6 is provided for the sensor PKG housing 3. The first tilt sensor 6 detects the tilt of an object provided with the first tilt sensor 6. The first tilt sensor 6 may detect a tilt referring to the horizontal, for example. The first tilt sensor 6 may detect a tilt referring to the value of the first tilt sensor 6 at the time of initial installation as above. The first tilt sensor 6 is provided for the sensor PKG housing 3. The sensor PKG housing 3 is provided for the subject vehicle. The first tilt sensor 6 detects not only the tilt of the sensor PKG housing 3 but also the tilt of the subject vehicle. The first tilt sensor 6 may adopt a 3-axis low G acceleration sensor, for example. The first tilt sensor 6 may adopt any tilt sensor other than the 3-axis low-G acceleration sensor.

The image processing device 7 is connected to the external camera 4, the LiDAR device 5, and the first tilt sensor 6. The image processing device 7 is connected to the second tilt sensor 8, the vehicle speed sensor 9, and the automatic driving ECU 10 via an in-vehicle LAN. The image processing device 7 may be connected to the second tilt sensor 8, the vehicle speed sensor 9, and the automatic driving ECU 10 without the use of the in-vehicle LAN. The image processing device 7 acquires sensing information output from the external camera 4 and the LiDAR device 5. From the sensing information, the image processing device 7 detects a target and the target position referring to the subject vehicle. A tilt of the mounting position of the sensor PKG housing 3 referring to the subject vehicle from the initial position deviates the detection axes of the peripheral monitoring sensors such as the external camera 4 and the LiDAR device 5 from the initial positions. In such a case, the image processing device 7 may deviate the detection result of the target position from the sensing information corresponding to the tilt from the initial position. The image processing device 7 detects a tilt of the sensor PKG housing 3 from the initial position to suppress the deviation in the detection result of the target position. The description below explains a configuration in which the image processing device 7 detects tilts of the sensor PKG housing 3 from the initial position. A schematic configuration of the image processing device 7 will be described later.

The second tilt sensor 8 is provided for the subject vehicle at a location other than the sensor PKG housing 3. The second tilt sensor 8 detects the tilt of an object provided with the second tilt sensor 8. The second tilt sensor 8 may detect a tilt against the horizontal, for example. The second tilt sensor 8 may detect a tilt referring to the value of the second tilt sensor 8 at the time of initial installation as above. The second tilt sensor 8 is provided for the subject vehicle at a location except for the sensor PKG housing 3 and therefore detects the tilt of the subject vehicle exclusive of the tilt of the sensor PKG housing 3. The second tilt sensor 8 may adopt a 3-axis low G acceleration sensor, for example. The second tilt sensor 8 may adopt any tilt sensor other than the 3-axis low-G acceleration sensor. It is preferable to use the same type of tilt sensor for the first tilt sensor 6 and the second tilt sensor 8. This aims at avoiding errors due to differences in measurement methods.

By reference to FIG. 2, the description below explains an arrangement of the external camera 4, the LiDAR device 5, the first tilt sensor 6, and the second tilt sensor 8 according to the first embodiment. As above, the sensor PKG housing 3 is assumed to have an approximately rectangular shape along the top surface of the roof of the subject vehicle.

Four external cameras 4 are installed in the sensor PKG housing 3 to cover imaging ranges of the front, left side, right side, and rear of the subject vehicle. The external camera 4 assumes the imaging range to be a sensing range. In the following, an external camera 401 signifies the external camera 4 whose imaging range corresponds to the front of the subject vehicle. An external camera 402 signifies the external camera 4 whose imaging range corresponds to the right side of the subject vehicle. An external camera 403 signifies the external camera 4 whose imaging range corresponds to the left side of the subject vehicle. An external camera 404 signifies the external camera 4 whose imaging range corresponds to the rear of the subject vehicle. The external camera 401 is provided for the sensor PKG housing 3 toward the front of the subject vehicle. The external camera 402 is provided for the sensor PKG housing 3 toward the left of the subject vehicle. The external camera 403 is provided for the sensor PKG housing 3 toward the right of the subject vehicle. The external camera 404 is provided for the sensor PKG housing 3 toward the rear of the subject vehicle.

Three LiDAR devices 5 are installed in the sensor PKG housing 3 to cover scanning ranges of the front, left rear side, and right rear side of the subject vehicle. The LiDAR device 5 assumes the scanning range to be a sensing range. Hereinafter, a LiDAR device 501 signifies the LiDAR device 5 whose scanning range corresponds to the front of the subject vehicle. A LiDAR device 502 signifies the LiDAR device 5 whose scanning range corresponds to the left rear side of the subject vehicle. A LiDAR device 503 signifies the LiDAR device 5 whose scanning range corresponds to the right rear side of the subject vehicle. The LiDAR device 501 is provided for the sensor PKG housing 3 toward the front of the subject vehicle. The LiDAR device 502 is provided for the sensor PKG housing 3 toward the left rear side of the subject vehicle. The LiDAR device 503 is provided for the sensor PKG housing 3 toward the right rear side of the subject vehicle.

Figure 3:
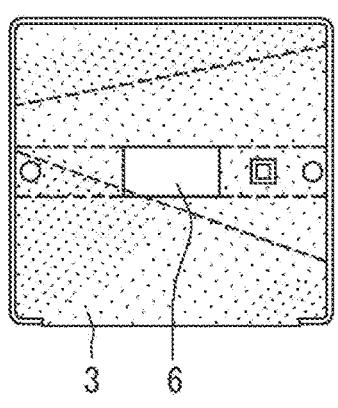
FIG. 3 is a diagram illustrating vibrations of a sensor package housing depending on resonance frequencies.
Figure 3:
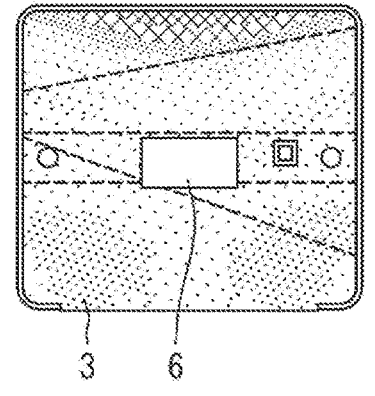
Figure 3:
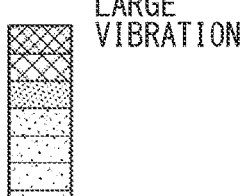

One first tilt sensor 6 is provided inside the sensor PKG housing 3. As illustrated in FIG. 3, the first tilt sensor 6 is preferably provided at a location that is hardly affected by the vibrations of the sensor PKG housing 3. It is impossible to accurately detect tilts due to a strong influence of vibrations from the subject vehicle, for example, if the first tilt sensor 6 is installed at the resonance point of the sensor PKG housing 3 or a hardly vibrating location. FIG. 3 is a diagram illustrating the vibration magnitudes of the sensor PKG housing 3 depending on different resonance frequencies. As illustrated in FIG. 3, the first tilt sensor 6 may be placed in an area of the sensor PKG housing 3 where the sensor PKG housing 3 generates a small vibration. For example, simulation can be used to find vibration magnitudes of the sensor PKG housing 3 depending on different resonance frequencies. As illustrated in FIG. 2, the one second tilt sensor 8 is provided for the subject vehicle at a location other than the sensor PKG housing 3.

The vehicle speed sensor 9 detects the speeds of the subject vehicle. The automatic driving ECU 10 recognizes the traveling environment around the subject vehicle based on information, output from the sensor PKG 2, such as the position of a target referring to the subject vehicle. Based on the recognized traveling environment, the automatic driving ECU 10 generates a travel plan to automatically travel the subject vehicle through the use of an automatic driving function. The automatic driving ECU 10 embodies automatic traveling in cooperation with the ECU that provides the travel control. In terms of automatic traveling, the system may provide both or part of the acceleration/deceleration control and the steering control.

The HCU 11 is mainly composed of a computer including a processor, volatile memory, nonvolatile memory, input/output, and a bus connecting these. The HCU 11 executes a control program stored in the non-volatile memory to perform various processes concerning the interaction between an occupant and the subject vehicle system.

The presentation device 12 is provided for the subject vehicle and provides information to the interior of the subject vehicle. The presentation device 12 provides information according to instructions from the HCU 11. The presentation device 12 needs to provide information at least for the driver. The presentation device 12 may also provide information for fellow passengers as well as the driver. The presentation device 12 includes a display device and an audio output device, for example.

The display device provides information by displaying the information. The display device can adopt a meter MID (Multi Information Display), CID (Center Information Display), or HUD (Head-Up Display), for example. The meter MID is a display device installed in front of the driver's seat inside the vehicle interior. The meter MID may be provided for a meter panel, for example. The CID is a display device placed at the center of the subject vehicle's instrument panel. The HUD is provided for the instrument panel in the vehicle interior, for example. The HUD projects display images formed by a projector onto a predetermined projection area on a front windshield as a projection member. The driver sitting in the driver's seat perceives the image light reflected off the front windshield toward the vehicle compartment. A virtual image of the display image is formed in front of the front windshield. The driver can visually recognize the virtual image overlapping with a part of the foreground. The HUD may project display images onto a combiner provided in front of the driver's seat instead of the front windshield. The audio output device provides information by outputting audio. The audio output device includes a speaker, for example.

Schematic Configuration of the Image Processing Device 7

The description below explains the schematic configuration of the image processing device 7 by reference to FIGS. 1 and 4. As illustrated in FIG. 1, the image processing device 7 is an electronic control device mainly composed of an arithmetic circuit including a processing portion 71, RAM 72, a storage portion 73, and an input/output interface (I/O) 74. The processing portion 71, the RAM 72, the storage portion 73, and the I/O 74 may be connected via a bus.

The processing portion 71 is provided as arithmetic processing hardware combined with the RAM 72. The processing portion 71 includes at least one arithmetic core such as CPU (Central Processing Unit), GPU (Graphical Processing Unit), or FPGA. The processing portion 71 can be configured as an image processing chip further including an IP core including other dedicated functions, for example. Such an image processing chip may adopt an ASIC (Application Specific Integrated Circuit) specifically designed for automatic driving. The processing portion 71 accesses the RAM 72 to execute various processes to implement the functions of each functional block described later.

The storage portion 73 includes a nonvolatile storage medium. The storage medium is a non-transitory tangible storage medium that non-temporarily stores computer-readable programs and data. The non-transitional physical storage medium is available as semiconductor memory or a magnetic disk, for example. The storage portion 73 stores various programs such as a tilt detection program executed by the processing portion 71.

Figure 4:
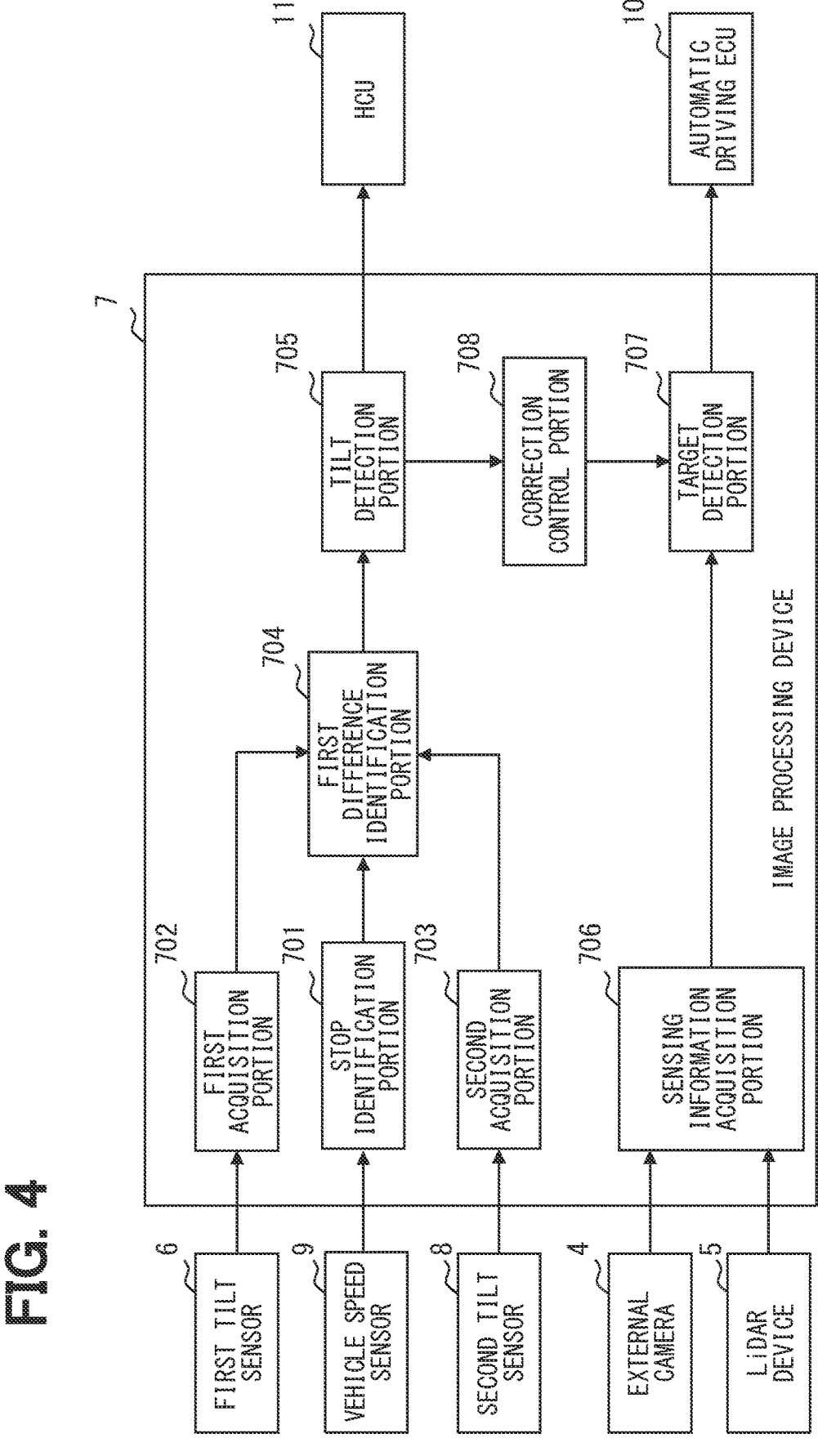
FIG. 4 is a diagram illustrating a schematic configuration of an image processing device.

As illustrated in FIG. 4, the image processing device 7 includes functional blocks such as a stop identification portion 701, a first acquisition portion 702, a second acquisition portion 703, a first difference identification portion 704, a tilt detection portion 705, a sensing information acquisition portion 706, a target detection portion 707, and a correction control portion 708. The image processing device 7 is comparable to the tilt detection device. The computer executes processes of the functional blocks of the image processing device 7. This is comparable to the execution of the tilt detection method. For example, hardware using one or more ICs may configure all or part of the functions executed by the image processing device 7. A combination of software executed by a processor and hardware components may implement all or part of the functional blocks included in the image processing device 7.

The stop identification portion 701 determines whether the subject vehicle stops. The stop identification portion 701 may determine whether the subject vehicle stops, based on the vehicle speed detected by the vehicle speed sensor 9. The stop identification portion 701 may determine whether the subject vehicle stops, based on any other criteria than the vehicle speed detected by the vehicle speed sensor 9. For example, the subject vehicle may be determined to stop from the time to turn on a switch (a power switch) to start the subject vehicle's internal combustion engine or motor generator until the press of an accelerator pedal is detected. The press of the accelerator pedal may be detected through the use of an accelerator stroke sensor, for example.

The first acquisition portion 702 acquires tilt information (first tilt information) detected by the first tilt sensor 6. The first tilt information may represent a value detected by the first tilt sensor 6. The process in the first acquisition portion 702 is comparable to a first acquisition step. The second acquisition portion 703 acquires tilt information (second tilt information) detected by the second tilt sensor 8. The second tilt information may represent a value detected by the second tilt sensor 8. The process in the second acquisition portion 703 is comparable to a second acquisition step.

The first difference identification portion 704 identifies a difference (first difference) between the tilt of the moving object and the tilt of the sensor PKG housing 3 referring to a common reference state based on the first tilt information acquired by the first acquisition portion 702 and the second tilt information acquired by the second acquisition portion 703. The process in the first difference identification portion 704 is comparable to a first difference identification step. The common reference state may be defined as being horizontal, for example. The common reference state may also be defined as the state at the time of initial installation as described above as well as the horizontal state. The first tilt information and the second tilt information may use different criteria. In such a case, the first difference identification portion 704 can identify the first difference by converting these pieces of information into a value referring to the common reference state.

The first difference identification portion 704 preferably identifies the first difference based on the first tilt information acquired by the first acquisition portion 702 and the second tilt information acquired by the second acquisition portion 703 while the subject vehicle stops. It is possible to highly accurately identify the first difference by excluding the influence of vibrations while the subject vehicle travels. Consequently, it is possible to improve the accuracy of detecting the tilt of the sensor PKG housing 3 from the initial position.

The period during which the subject vehicle stops may be defined as a period during which the stop identification portion 701 identifies the subject vehicle being stopped. In other words, the first difference identification portion 704 may identify the first difference based on the first tilt information and the second tilt information. Specifically, the first tilt information is acquired by the first acquisition portion 702 during the period in which the stop identification portion 701 identifies the subject vehicle being stopped. The second tilt information is acquired by the second acquisition portion 703 during the period in which the stop identification portion 701 identifies the subject vehicle being stopped. Moreover, the subject vehicle stops for a specified period after the subject vehicle's power switch turns on. This period may be used as the period during which the subject vehicle stops. The specified period here may be assumed to be the time during which the subject vehicle is highly likely to remain stopped after the subject vehicle's power switch turns on.

The tilt detection portion 705 detects that the sensor PKG housing 3 tilts from the initial position when the first difference identified by the first difference identification portion 704 exceeds a first allowable range. The process in the tilt detection portion 705 is comparable to a tilt detection step. The first allowable range determines whether to find an approximate match and may be defined optionally. The first allowable range may be approximate to an error, for example. The tilt detection portion 705 may detect that the sensor PKG housing 3 does not tilt from the initial position when the first difference identified by the first difference identification portion 704 falls inside the first allowable range.

The tilt detection portion 705 may notify the HCU 11 that the sensor PKG housing 3 is detected to tilt from the initial position. Then, the HCU 11 may cause the presentation device 12 to provide the pertinent information. For example, it may be favorable to display an icon to represent that the sensor PKG housing 3 tilts from the initial position.

The sensing information acquisition portion 706 acquires sensing information output from the external camera 4 and the LiDAR device 5. The external camera 4 and the LiDAR device 5 are collectively referred to as a peripheral monitoring sensor. The target detection portion 707 detects the position of a target (hereinafter simply referred to as a target position) referring to the target and the subject vehicle based on the sensing information acquired by the sensing information acquisition portion 706. When image data captured by the external camera 4 is used, the image recognition technology may detect targets and target positions. When ranging points acquired by the LiDAR device 5 are used, 3D detection processing such as F-PointNet or PointPillars may detect three-dimensional targets and target positions.

Suppose the tilt detection portion 705 detects that the sensor PKG housing 3 tilts from the initial position. In this case, the correction control portion 708 provides control to correct the sensing deviation in the peripheral monitoring sensor corresponding to the first difference based on the first difference identified by the first difference identification portion 704. For example, the target position detected by the target detection portion 707 may be corrected to eliminate the deviation corresponding to the first difference. An actuator may be operated to change the detection axis of the external camera 4 or the LiDAR device 5. In such a case, the actuator may be operated to eliminate the deviation corresponding to the first difference.

Tilt Detection Process in the Processing Portion 71

Figure 5:
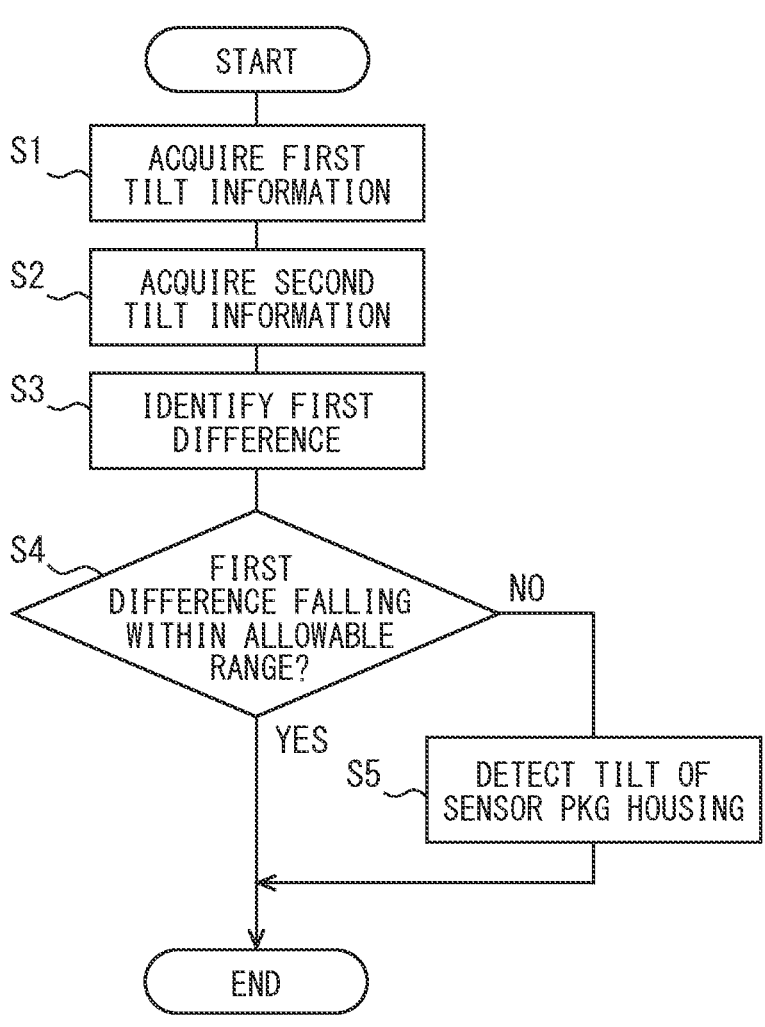
FIG. 5 is a flowchart illustrating the flow of a tilt detection process in a processing portion.

By reference to the flowchart in FIG. 5, the description below explains an example process (tilt detection process) of the processing portion 71 that detects tilts of the sensor PKG housing 3 from the initial position referring to the subject vehicle. The flowchart in FIG. 5 may start when the power switch of the subject vehicle turns on, for example. Alternatively, the flowchart in FIG. 5 may start under the condition that the subject vehicle's power switch is on, the stop identification portion 701 periodically identifies whether the subject vehicle stops and the subject vehicle is identified to stop.

At step S1, the first acquisition portion 702 acquires the first tilt information detected by the first tilt sensor 6. At step S2, the second acquisition portion 703 acquires the second tilt information detected by the second tilt sensor 8.

At step S3, the first difference identification portion 704 identifies the first difference based on the first tilt information acquired at S1 and the second tilt information acquired at S2. The first difference represents a difference between the tilt of the moving object and the tilt of sensor PKG housing 3 referring to the common reference state.

At step S4, the first difference identified at S3 may fall inside the first allowable range (YES at S4). Then, the tilt detection process terminates. In this case, the tilt detection portion 705 may detect that the sensor PKG housing 3 does not tilt from the initial position. The first difference identified at S3 does not fall inside the first allowable range (NO at S4). Then, the process proceeds to step S5. At step S5, the tilt detection portion 705 detects that the sensor PKG housing 3 tilts from the initial position, and performs the tilt detection process.

Overview of the First Embodiment

The configuration according to the first embodiment detects that the sensor PKG housing 3 is tilted from the initial position when the first difference exceeds the first allowable range. The first difference is defined between the tilt of the subject vehicle and the tilt of the sensor PKG housing 3 referring to the common reference state. The sensor PKG housing 3 is mounted on a moving object. Therefore, the first tilt information detected by the first tilt sensor 6 provided for the sensor PKG housing 3 also includes information about the tilt of the moving object. The second tilt information detected by the second tilt sensor 8 concerns the tilt of the moving object exclusive of the information about the tilt of the sensor PKG housing 3 itself because the second tilt sensor 8 is provided for the moving object except for the sensor PKG housing 3. The first difference provides the tilt of the sensor PKG housing 3 itself except for the tilt of the moving object. It is possible to detect a tilt of the sensor PKG housing 3 from the initial position based on the tilt of the sensor PKG housing 3 itself except for the tilt of the moving object. It is possible to prevent the subject vehicle tilt caused by an air suspension from being incorrectly detected as the tilt of the sensor PKG housing 3 itself. Consequently, it is possible to highly accurately detect the tilt of the sensor PKG housing 3 (mounted on the subject vehicle) from the initial position. This also makes it easier to determine the necessity of calibration on the peripheral monitoring sensor.

Second Embodiment

The first embodiment illustrates the configuration in which the sensor PKG housing 3 includes the image processing device 7. However, the configuration is not necessarily limited thereto. For example, there may be a configuration (second embodiment) in which the sensor PKG housing 3 does not include the image processing device 7. The description below explains the configuration according to the second embodiment.

Schematic Configuration of the Vehicular System 1A

The vehicular system 1a can be used for vehicles. As illustrated in FIG. 6, a vehicular system 1a includes a sensor PKG 2a, an image processing device 7a, the second tilt sensor 8, the vehicle speed sensor 9, the automatic driving ECU 10, and the HCU 11, and the presentation device 12. The vehicular system 1a is similar to the vehicular system 1 according to the first embodiment except that the sensor PKG 2a is included instead of the sensor PKG 2, and the image processing device 7a is included instead of the image processing device 7.

As illustrated in FIG. 6, the sensor PKG 2a includes the external camera 4, the LiDAR device 5, the first tilt sensor 6. The sensor PKG 2a is similar to the sensor PKG 2 according to the first embodiment except that the image processing device 7 is excluded.

The image processing device 7a is similar to the image processing device 7 according to the first embodiment except that the image processing device 7a is not included inside the sensor PKG housing 3. The second embodiment 2 may be provided anywhere such as inside a vehicle compartment of the subject vehicle. A configuration including the sensor PKG 2a, the image processing device 7, and the second tilt sensor 8 also corresponds to the tilt detection system.

Overview of the Second Embodiment

The configuration of the second embodiment is similar to that of the first embodiment except that the image processing device 7 is not included in the sensor PKG housing 3.

Similar to the first embodiment, it is possible to highly accurately detect the tilt of the sensor PKG housing 3, mounted on the subject vehicle, from the initial position.

Third Embodiment

The first embodiment illustrates the configuration that uses one first tilt sensor 6 and one second tilt sensor 8. However, the present disclosure is not necessarily limited thereto. For example, there may be a configuration (third embodiment) that uses two first tilt sensors 6 and two second tilt sensors 8. The description below explains the configuration according to the third embodiment. For convenience sake, the third embodiment denotes the first tilt sensor 6 as a first tilt sensor 6b and the second tilt sensor 8 as a second tilt sensor 8b.

Schematic Configuration of the Vehicular System 1B

Figure 7:
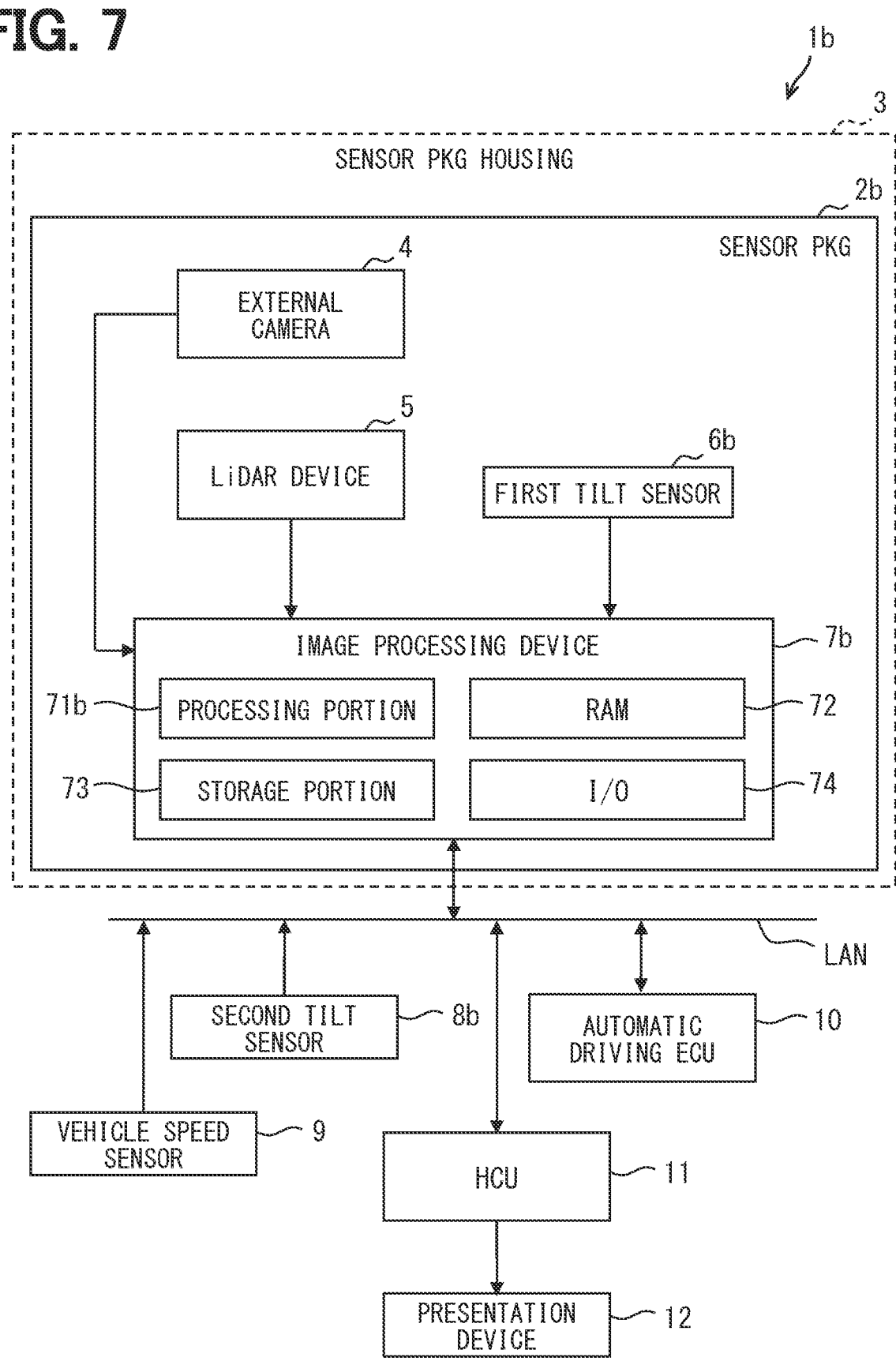
FIG. 7 is a diagram illustrating a schematic configuration of a vehicle system.

The vehicular system 1b can be used for vehicles. As illustrated in FIG. 7, the vehicular system 1b includes a sensor PKG 2b, the second tilt sensor 8b, the vehicle speed sensor 9, the automatic driving ECU 10, the HCU 11, and the presentation device 12. The vehicular system 1b is similar to the vehicular system 1 according to the first embodiment, except that the sensor PKG 2b is included instead of the sensor PKG 2, and the second tilt sensor 8b is included instead of the second tilt sensor 8.

The second tilt sensor 8b is similar to the second tilt sensor 8 according to the first embodiment except that two second tilt sensors 8b are used. As illustrated in FIG. 7, the sensor PKG 2b includes the external camera 4, the LiDAR device 5, a first tilt sensor 6b, and an image processing device 7b. The sensor PKG 2b is similar to the sensor PKG 2 according to the first embodiment except that the first tilt sensor 6b and an image processing device 7b are included instead of the first tilt sensor 6 and the image processing device 7. A schematic configuration of the image processing device 7b will be described later. The first tilt sensor 6b is similar to the first tilt sensor 6 according to the first embodiment except that two first tilt sensors 6b are used. A configuration including the sensor PKG 2b and the second tilt sensor 8b also corresponds to the tilt detection system.

By reference to FIG. 8, the description below explains an arrangement of the external camera 4, the LiDAR device 5, the first tilt sensor 6b, and the second tilt sensor 8b according to the second embodiment. As above, the sensor PKG housing 3 is assumed to have an approximately rectangular shape along the top surface of the roof of the subject vehicle. The placement of the external camera 4 and the LiDAR device 5 is similar to that described in the first embodiment by reference to FIG. 2.

Two first tilt sensors 6b are provided inside the sensor PKG housing 3. In the description below, the two first tilt sensors 6b are referred to as a first tilt sensor 601 and a first tilt sensor 602. The two second tilt sensors 8b are provided for the subject vehicle except for the sensor PKG housing 3. In the description below, the two second tilt sensors 8b are referred to as a second tilt sensor 801 and a second tilt sensor 802.

Figure 8:
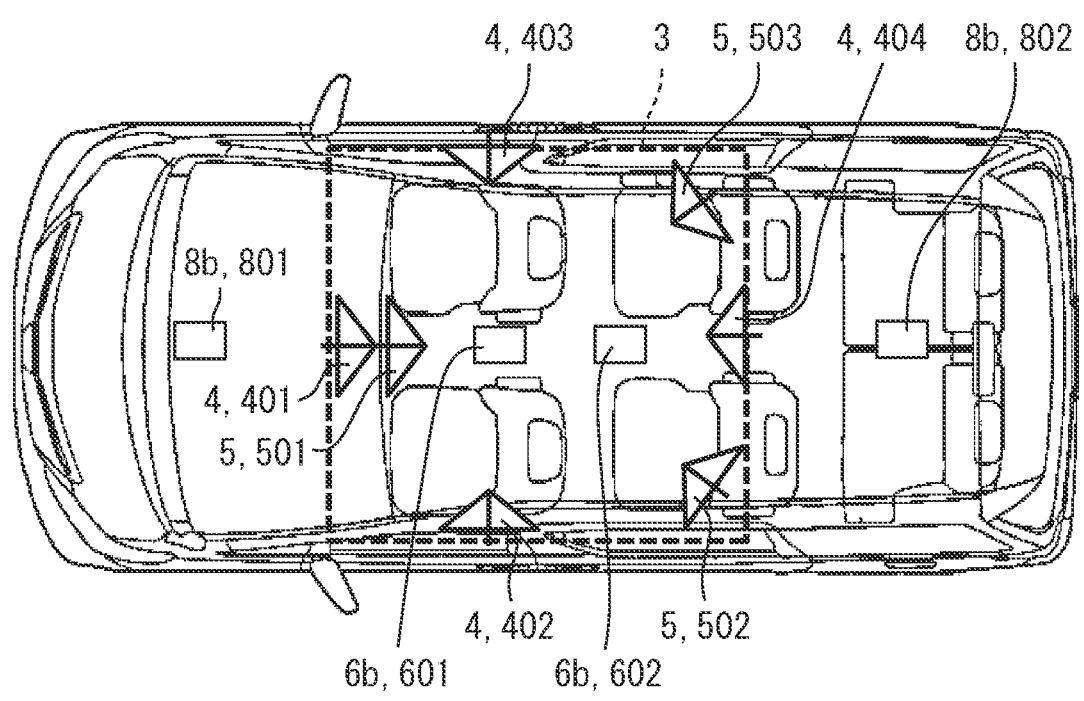
FIG. 8 is a diagram illustrating an arrangement of the external camera, the LiDAR device, a first tilt sensor, and a second tilt sensor according to a third embodiment.

As illustrated in FIG. 8, the two first tilt sensors 6b and the two second tilt sensors 8b are preferably positioned along the longitudinal axis of the subject vehicle. The two first tilt sensors 6b and the two second tilt sensors 8b may be positioned along the left-right axis of the subject vehicle. The placement of multiple first tilt sensors 6b and multiple second tilt sensors 8b on the same axis can suppress errors influenced by roll, yaw, and pitch components from a first difference identification portion 704b, a second difference identification portion 709, and a third difference identification portion 711, as will be described later. It is more preferable to place the two first tilt sensors 6b and the two second tilt sensors 8b along the longitudinal axis of the subject vehicle.

As illustrated in FIG. 8, suppose the sensor PKG housing 3 is divided into two areas, a front wheel side and a rear wheel side of the subject vehicle. Then, it is preferable to place the first tilt sensor 601 on the front wheel side and the first tilt sensor 602 on the rear wheel side. In other words, it is preferable to place the first tilt sensor 6b on each of the front and rear wheel sides. This makes it possible to more accurately detect tilts of the sensor PKG housing 3 from the initial position exclusive of the influence of tilts of the subject vehicle due to air suspension or tire pressure from only one of the front and rear wheel sides.

As illustrated in FIG. 8, suppose the subject vehicle is divided into two areas, a front wheel side and a rear wheel side. Then, it is preferable to place the second tilt sensor 801 on the front wheel side and the second tilt sensor 802 on the rear wheel side. In other words, it is preferable to place the second tilt sensor 8b on each of the front and rear wheel sides. This makes it possible to more accurately detect tilts of the sensor PKG housing 3 from the initial position exclusive of the influence of tilts of the subject vehicle due to air suspension or tire pressure from only one of the front and rear wheel sides.

Schematic Configuration of the Image Processing Device 7B

The description below explains the schematic configuration of the image processing device 7b by reference to FIGS. 7 and 9. As illustrated in FIG. 7, the image processing device 7b is an electronic control device that is mainly composed of an arithmetic circuit including a processing portion 71b, RAM 72, a storage portion 73, and an I/O 74. The image processing device 7b is similar to the image processing device 7 according to the first embodiment except that a processing portion 71a is provided instead of the processing portion 71.

Figure 9:
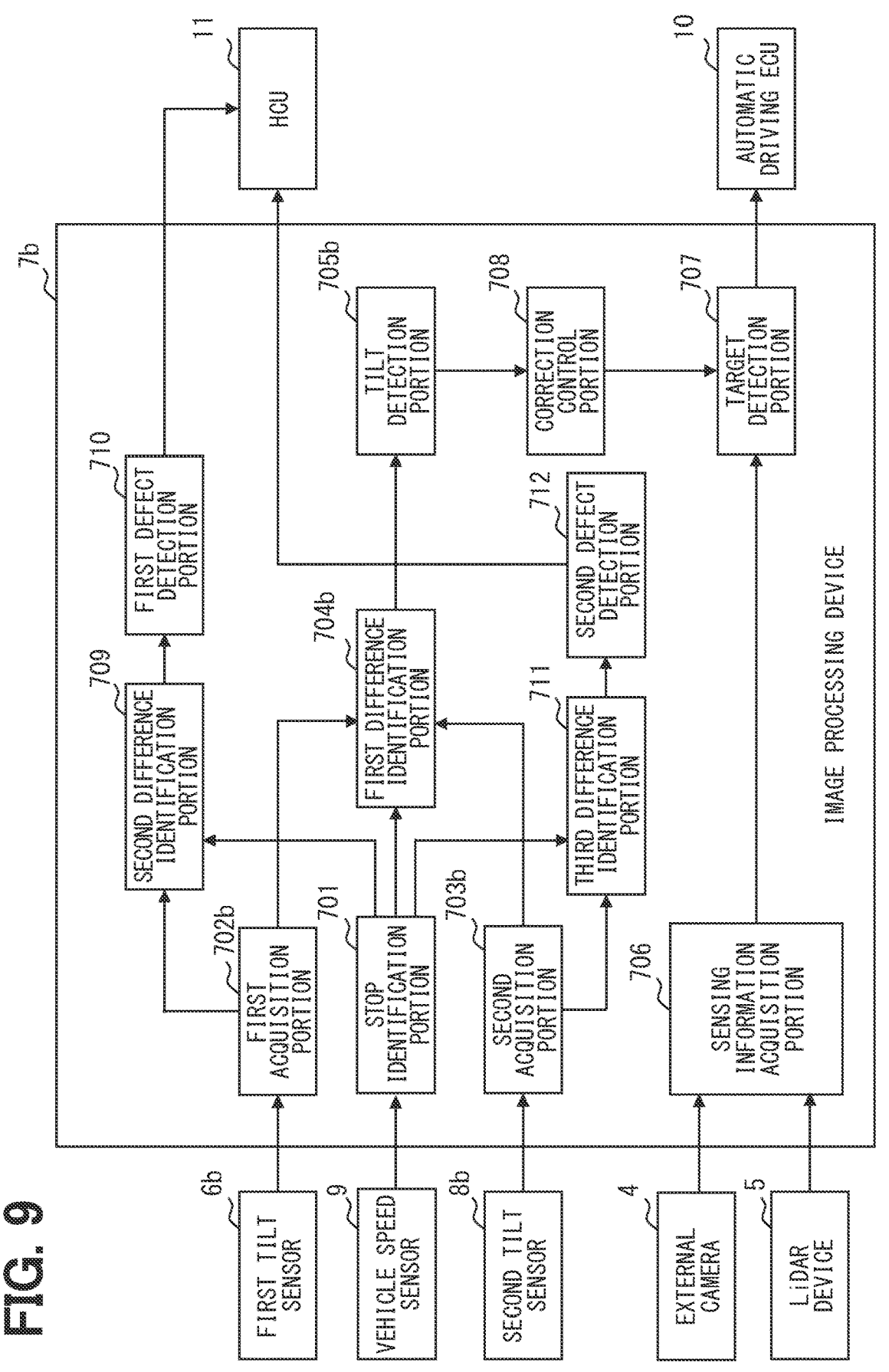
FIG. 9 is a diagram illustrating a schematic configuration of an image processing device.

As illustrated in FIG. 9, the image processing device 7b includes functional blocks such as the stop identification portion 701, a first acquisition portion 702b, a second acquisition portion 703b, the first difference identification portion 704b, a tilt detection portion 705b, the sensing information acquisition portion 706, the target detection portion 707, the correction control portion 708, the second difference identification portion 709, a first defect detection portion 710, the third difference identification portion 711 and a second defect detection portion 712. The image processing device 7b is also comparable to the tilt detection device. The computer executes processes of the functional blocks of the image processing device 7b. This is also comparable to the execution of the tilt detection method. The functional blocks of the image processing device 7b are similar to those of the image processing device 7 according to the first embodiment except that the first acquisition portion 702b, the second acquisition portion 703b, the first difference identification portion 704b, and a tilt detection portion 705b are provided instead of the first acquisition portion 702, the second acquisition portion 703, the first difference identification portion 704, and the tilt detection portion 705, and except that there are provided the second difference identification portion 709, a first defect detection portion 710, the third difference identification portion 711, and the second defect detection portion 712.

The first acquisition portion 702b acquires the first tilt information detected by the multiple first tilt sensors 6b. The example according to the present embodiment acquires the first tilt information from the first tilt sensors 601 and 602. The process in the first acquisition portion 702b is also comparable to a first acquisition step. The second acquisition portion 703b acquires the second tilt information detected by the multiple second tilt sensors 8b. The example according to the present embodiment acquires the second tilt information from the second tilt sensors 801 and 802. The process in the second acquisition portion 703b is also comparable to a second acquisition step.

The second difference identification portion 709 identifies a second difference, namely, a difference in tilts between the multiple first tilt sensors 6b referring to the common reference state based on the first tilt information about the multiple first tilt sensors 6b acquired by the first acquisition portion 702b. The common reference state may be defined as being horizontal, for example. The common reference state may also be defined as the state at the time of initial installation as described above as well as the horizontal state. In the example of the present embodiment, the second difference signifies a difference between the tilt detected by the first tilt sensor 601 and the tilt detected by the first tilt sensor 602 referring to the common reference state.

The first defect detection portion 710 detects a defect in the first tilt sensor 6b when the second difference identified by the second difference identification portion 709 exceeds the second tolerance range. The first defect detection portion 710 detects no defect in the first tilt sensor 6b when the second difference identified by the second difference identification portion 709 falls inside the second tolerance range. The second allowable range determines whether to find an approximate match and may be defined optionally. The second allowable range may be approximate to an error, for example. The first defect detection portion 710 detects defects such as a tilt of any one of the first tilt sensors 6b from the initial position or a defect in any one of the first tilt sensors 6b. An example of the defect in the first tilt sensor 6b may be a malfunction of the first tilt sensor 6b.

When detecting a defect in the first tilt sensor 6b, the first defect detection portion 710 may notify the HCU 11 of the defect detection so that the HCU 11 allows the presentation device 12 to provide the information about the defect detection. For example, the presentation device 12 may display an icon indicating the occurrence of a defect on the first tilt sensor 6b. Alternatively, diagnostic information may be recorded for a diagnostic tool to read. This makes it easy to take appropriate action against the defect of the first tilt sensor 6b.

The third difference identification portion 711 identifies a third difference, namely, a difference in tilts between the multiple second tilt sensors 8b referring to the common reference state based on the second tilt information about the multiple second tilt sensors 8b acquired by the second acquisition portion 703b. The common reference state may be defined as being horizontal, for example. The common reference state may also be defined as the state at the time of initial installation as described above as well as the horizontal state. In the example of the present embodiment, the third difference signifies a difference between the tilt detected by the second tilt sensor 801 and the tilt detected by the second tilt sensor 802 referring to the common reference state.

The second defect detection portion 712 detects a defect in the second tilt sensor 8b when the third difference identified by the third difference identification portion 711 exceeds the third tolerance range. The second defect detection portion 712 detects no defect in the second tilt sensor 8b when a third difference identified in the third difference identification portion 711 falls inside a third tolerance range. The third allowable range determines whether to find an approximate match and may be defined optionally. The third allowable range may be approximate to an error, for example. The second defect detection portion 712 detects defects such as a tilt of any one of the second tilt sensors 8*b* from the initial position or defect in any one of the second tilt sensors 8*b*. An example of the defect in the second tilt sensor 8*b* may be a malfunction of the second tilt sensor 8*b*.

When detecting a defect in the second tilt sensor 8*b*, the second defect detection portion 712 may notify the HCU 11 of the defect detection so that the HCU 11 allows the presentation device 12 to provide the information about the defect detection. For example, the presentation device 12 may display an icon indicating the occurrence of a defect on the second tilt sensor 8*b*. Alternatively, diagnostic information may be recorded for a diagnostic tool to read. This makes it easy to take appropriate action against the defect of the second tilt sensor 8*b*.

The first difference identification portion 704*b* identifies the first difference, a difference between the tilt of a moving object and the tilt of the sensor PKG housing 3 referring to the common reference state, based on the first tilt information acquired by the first acquisition portion 702*b* and the second tilt information acquired by the second acquisition portion 703*b*. The process in the first difference identification portion 704*b* is also comparable to the first difference identification step. The common reference state may be similarly applicable to the process in the first difference identification portion 704.

The first difference identification portion 704*b* preferably identifies the first difference when no defect is detected in either the first defect detection portion 710 or the second defect detection portion 712. Similar to the first difference identification portion 704, the first difference identification portion 704*b* preferably identifies the first difference based on the first tilt information acquired by the first acquisition portion 702*b* and the second tilt information acquired by the second acquisition portion 703*b* while the subject vehicle stops.

The first difference identification portion 704*b* may identify the first difference in terms of a difference between the average of tilts in the first tilt sensors 6*b* and the average of tilts in the second tilt sensors 8*b*. The first difference identification portion 704*b* may also identify the first difference in terms of an average of tilt differences calculated from sets of more closely positioned first tilt sensors 6*b* and second tilt sensors 8*b*. The example according to the present embodiment may calculate a tilt difference in each of the set of first tilt sensor 601 and second tilt sensor 801, the set of first tilt sensor 602 and second tilt sensor 802. No defect may be detected in either the first defect detection portion 710 or the second defect detection portion 712. In such a case, approximately the same first difference results from any set of the first tilt sensor 6*b* and the second tilt sensor 8*b* out of the multiple first tilt sensors 6*b* and the multiple second tilt sensors 8*b*. The first difference identification portion 704*b* may identify the first difference in terms of a tilt difference in any one set of the first tilt sensor 6*b* and the second tilt sensor 8*b*.

The tilt detection portion 705*b* detects that the sensor PKG housing 3 tilts from the initial position when the second difference identified by the second difference identification portion 709 falls inside the second allowable range; the third difference identified by the third difference identification portion 711 falls inside the third allowable range; and the first difference identified by the first difference identification portion 704*b* does not fall inside the first allowable range. It is possible to prevent the sensor PKG housing 3 from being incorrectly detected to tilt from the initial position based on the first difference value caused by a defect of the first tilt sensor 6*b* or the second tilt sensor 8*b*. The process in the tilt detection portion 705*b* is also comparable to a tilt detection step. The tilt detection portion 705*b* does not detect that the sensor PKG housing 3 tilts from the initial position when the second difference identified by the second difference identification portion 709 does not fall inside the second allowable range; or the third difference identified by the third difference identification portion 711 does not fall inside the third allowable range. The tilt detection portion 705*b* does not detect that the sensor PKG housing 3 tilts from the initial position when the second difference identified by the second difference identification portion 709 falls inside the second allowable range; the third difference identified by the third difference identification portion 711 falls inside the third allowable range; and the first difference identified by the first difference identification portion 704*b* falls inside the first allowable range.

Tilt Detection Process in the Processing Portion 71B

Figure 10:
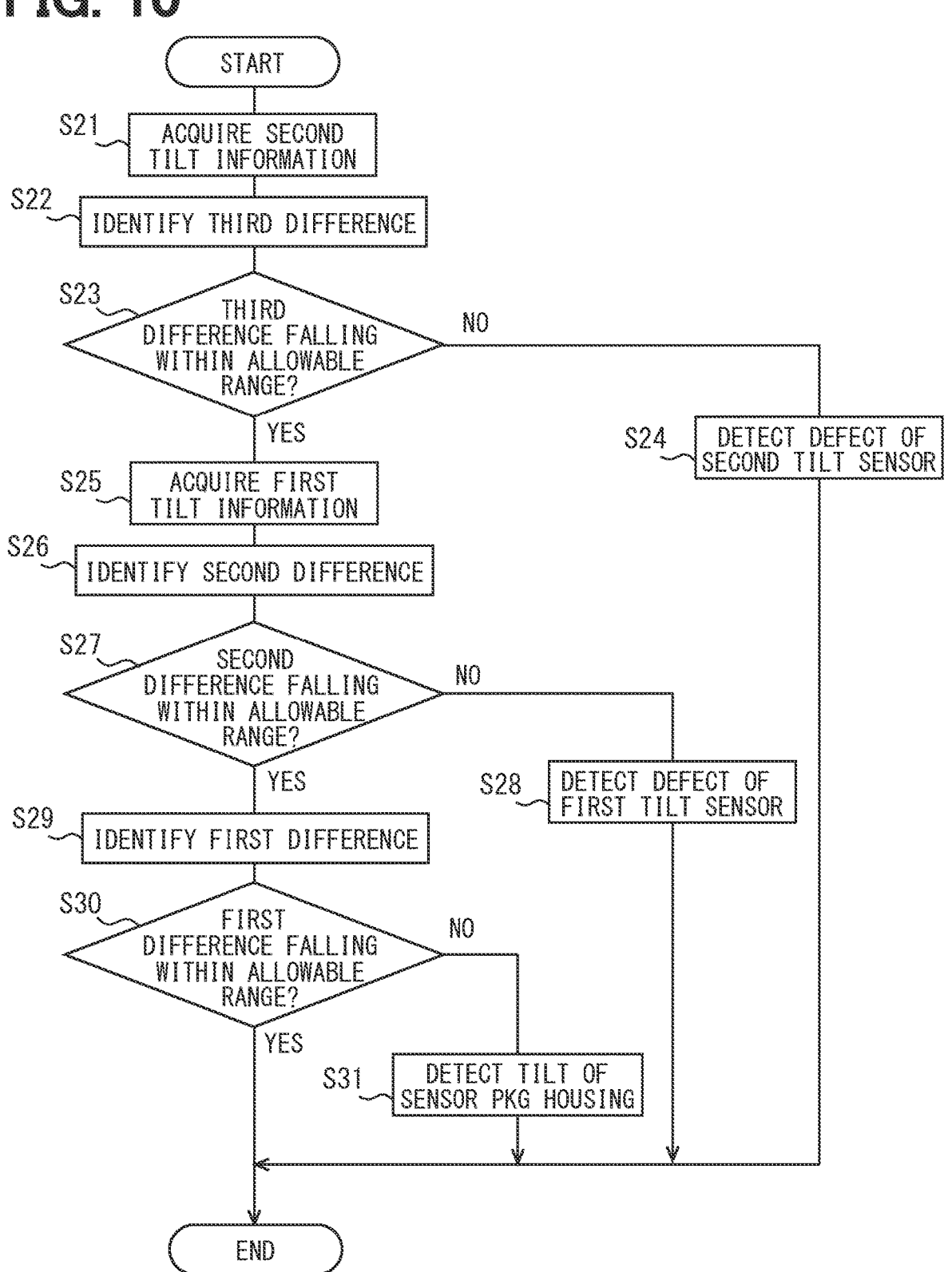
FIG. 10 is a flowchart illustrating the flow of a tilt detection process in a processing portion.

The description below explains an example of the tilt detection process in the processing portion 71*b* by reference to the flowchart in FIG. 10. The flowchart in FIG. 10 may start under conditions similar to those of the flowchart in FIG. 5.

At step S21, the second acquisition portion 703*b* acquires the second tilt information detected by each of the second tilt sensors 8*b*. At step S22, the third difference identification portion 711 identifies the third difference, namely, a tilt difference between the multiple second tilt sensors 8*b* referring to the common reference state based on the second tilt information about the second tilt sensors 8*b* acquired at S21.

At step S23, the third difference identified at S22 may fall inside the third allowable range (YES at S23). Then, the process proceeds to step S25. The third difference identified at S22 does not fall inside the third allowable range (NO at S23). Then, the process proceeds to step S24. At step S24, the second defect detection portion 712 detects a defect of the second tilt sensor 8*b*. Then, the tilt detection process terminates.

At step S25, the first acquisition portion 702*b* acquires the first tilt information detected by each of the first tilt sensors 6*b*. At step S26, the second difference identification portion 709 identifies the second difference, namely, a tilt difference between the multiple first tilt sensors 6*b* referring to the common reference state based on the second tilt information about the first tilt sensors 6*b* acquired at S25.

At step S27, the second difference identified at S26 may fall inside the second allowable range (YES at S27). Then, the process proceeds to step S29. The second difference identified at S26 does not fall inside the second allowable range (NO at S27). Then, the process proceeds to step S28. At step S28, the first defect detection portion 710 detects a defect of the first tilt sensor 6*b*. Then, the tilt detection process terminates.

At step S29, the first difference identification portion 704*b* identifies the first difference based on the second tilt information acquired at S21 and the first tilt information acquired at S5. The first difference represents a difference between the tilt of the moving object and the tilt of sensor PKG housing 3 referring to the common reference state.

At step S30, the first difference identified at S29 may fall inside the first allowable range (YES at S30). Then, the tilt detection process terminates. In this case, the tilt detection portion 705*b* may detect that the sensor PKG housing 3 does not tilt from the initial position. The first difference identified at S29 does not fall inside the first allowable range (NO at S30). Then, the process proceeds to step S31. At step S31, the tilt detection portion 705b detects that the sensor PKG housing 3 tilts from the initial position, and performs the tilt detection process.

Overview of the Third Embodiment

The third embodiment also detects that the sensor PKG housing 3 tilts from the initial position when the first difference, a difference between the tilt of the subject vehicle and the tilt of the sensor PKG housing 3 referring to the common reference state, does not fall inside the first allowable range. Similar to the first embodiment, it is possible to highly accurately detect the tilt of the sensor PKG housing 3, mounted on the subject vehicle, from the initial position.

The third embodiment has described the example of using two first tilt sensors 6b and two second tilt sensors 8b. However, the present disclosure is not necessarily limited thereto. For example, one first tilt sensor 6b or one second tilt sensor 8b may be used.

For example, the description below explains a configuration of using two first tilt sensors 6b and one second tilt sensor 8b. The tilt detection portion 705b may detect that the sensor PKG housing 3 tilts from the initial position when the second difference identified by the second difference identification portion 709 falls inside the second allowable range and the first difference identified by the first difference identification portion 704b does not fall inside the first allowable range. In this case, it may be favorable to omit the third difference identification portion 711 and the second defect detection portion 712. In the flowchart of FIG. 10, it may be favorable to omit the process from S21 through S24.

For example, the description below explains a configuration of using two second tilt sensors 8b and one second tilt sensor 6b. The tilt detection portion 705b may detect that the sensor PKG housing 3 tilts from the initial position when the third difference identified by the third difference identification portion 711 falls inside the third allowable range and the first difference identified by the first difference identification portion 704b does not fall inside the first allowable range. In this case, it may be favorable to omit the second difference identification portion 709 and the first defect detection portion 710. In the flowchart of FIG. 10, it may be favorable to omit the process from S25 through S28.

The number of the first tilt sensors 6b may differ from the number of the second tilt sensors 8b. Even in such a case, the first difference identification portion 704b may be able to identify the first difference by calculating the average tilt of the multiple tilt sensors, for example. The same applies to the subsequent embodiments.

It may be favorable to combine the configuration of the third embodiment and the configuration of the second embodiment.

Fourth Embodiment

The third embodiment illustrates the configuration that uses two first tilt sensors 6 and two second tilt sensors 8. However, the present disclosure is not necessarily limited thereto. For example, there may be a configuration (fourth embodiment) that uses three first tilt sensors 6 and three second tilt sensors 8. The description below explains the configuration according to the fourth embodiment. For convenience sake, the fourth embodiment denotes the first tilt sensor 6 as a first tilt sensor 6c and the second tilt sensor 8 as a second tilt sensor 8c.

Schematic Configuration of the Vehicular System 1c

Figure 11:
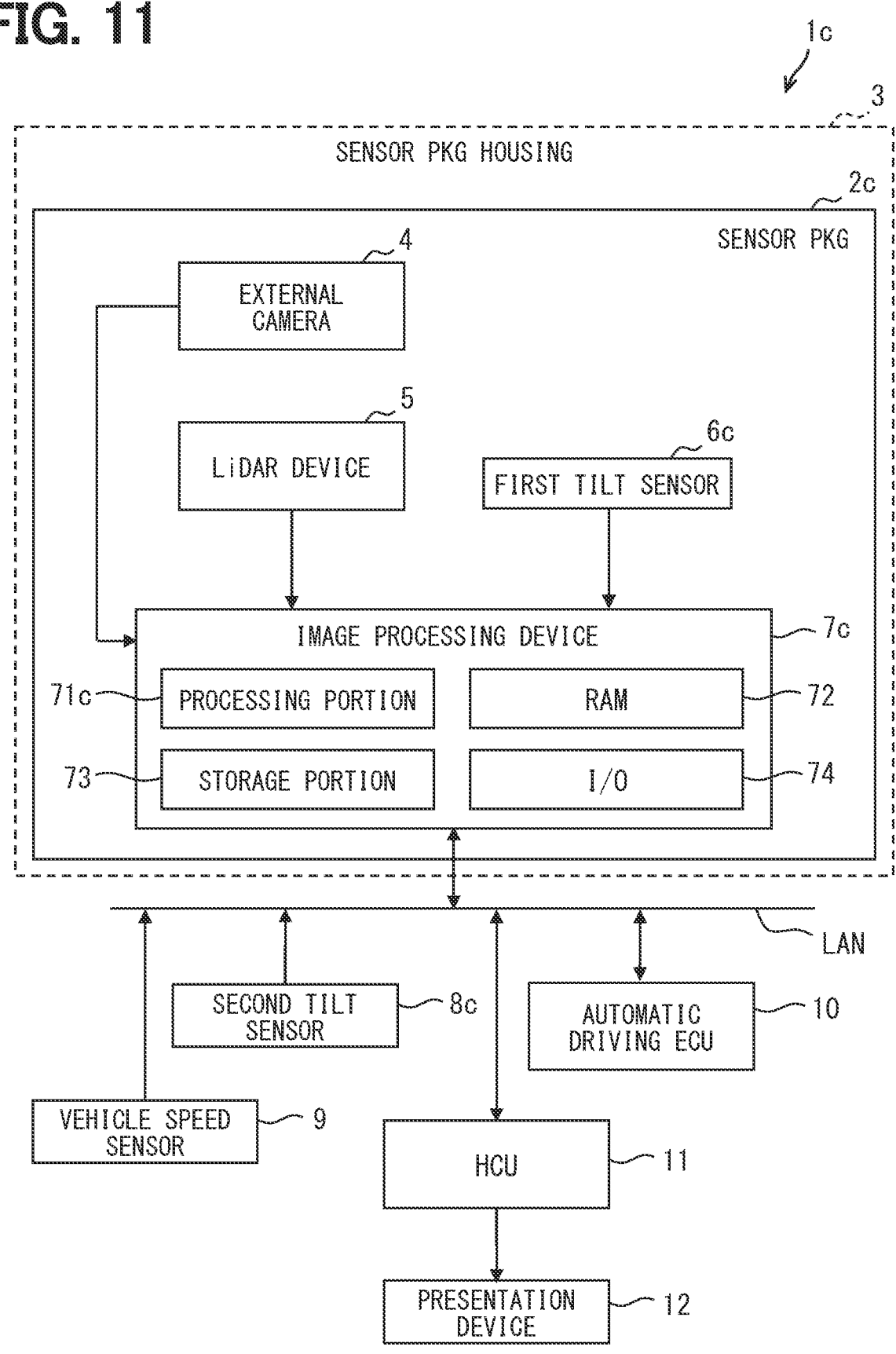
FIG. 11 is a diagram illustrating a schematic configuration of a vehicle system.

The vehicular system 1c can be used for vehicles. As illustrated in FIG. 11, a vehicular system 1c includes a sensor PKG 2c, a second tilt sensor 8c, the vehicle speed sensor 9, the automatic driving ECU 10, the HCU 11, and the presentation device 12. The vehicular system 1c is similar to the vehicular system 1 according to the first embodiment except that the sensor PKG 2c is included instead of the sensor PKG 2, and the second tilt sensor 8c is included instead of the second tilt sensor 8.

The second tilt sensor 8c is similar to the second tilt sensor 8 according to the first embodiment except that three second tilt sensors 8c are used. As illustrated in FIG. 11, the sensor PKG 2c includes the external camera 4, the LiDAR device 5, a first tilt sensor 6c, and an image processing device 7c. The sensor PKG 2c is similar to the sensor PKG 2 according to the first embodiment except that the first tilt sensor 6c and the image processing device 7c are included instead of the first tilt sensor 6 and the image processing device 7. A schematic configuration of the image processing device 7c will be described later. The first tilt sensor 6c is similar to the first tilt sensor 6 according to the first embodiment except that three first tilt sensors 6c are used. Also, configuration including the sensor PKG 2c and the second tilt sensor 8c corresponds to tilt detection system.

By reference to FIG. 12, the description below explains an arrangement of the external camera 4, the LiDAR device 5, the first tilt sensor 6c, and the second tilt sensor 8c according to the fourth embodiment. As above, the sensor PKG housing 3 is assumed to have an approximately rectangular shape along the top surface of the roof of the subject vehicle. The placement of the external camera 4 and the LiDAR device 5 is similar to that described in the first embodiment by reference to FIG. 2.

Three first tilt sensors 6c are provided inside the sensor PKG housing 3. In the description below, the three first tilt sensors 6c are referred to as first tilt sensors 601, 603 and 604. The three second tilt sensors 8c are provided for the subject vehicle except for the sensor PKG housing 3. In the description below, the three second tilt sensors 8c are referred to as second tilt sensors 801, 803 and 804.

Figure 12:
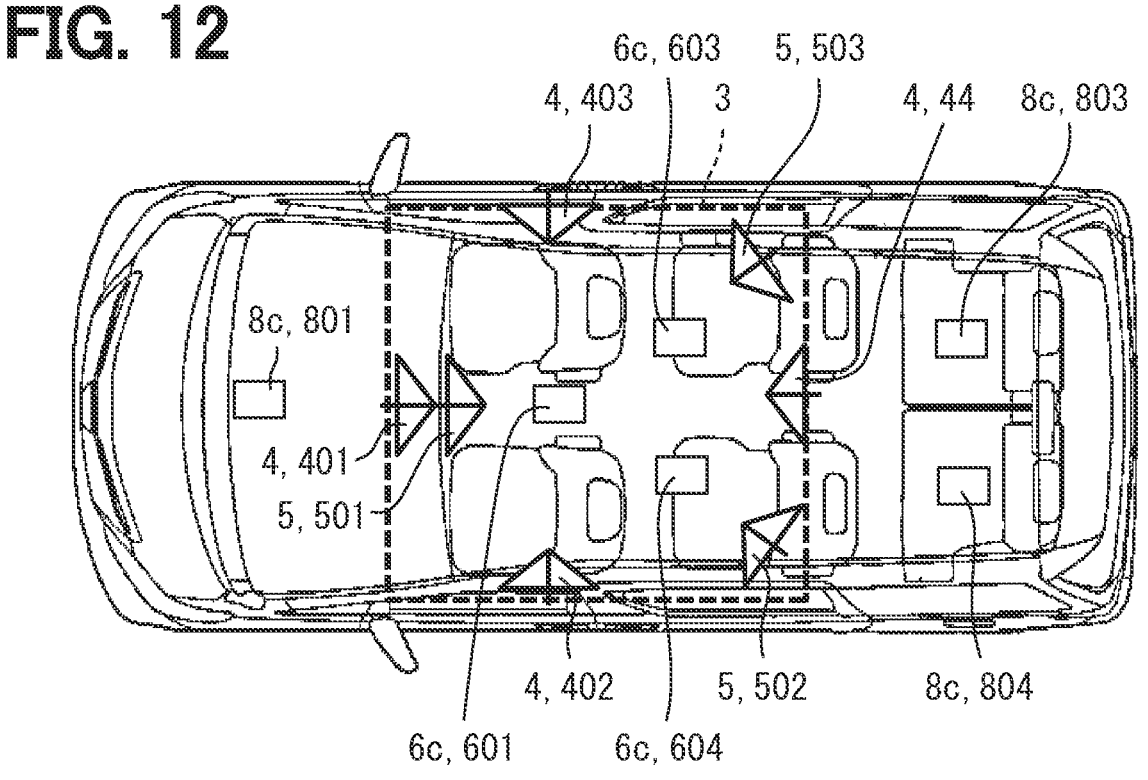
FIG. 12 is a diagram illustrating an arrangement of the external camera, the LiDAR device, a first tilt sensor, and a second tilt sensor according to a fourth embodiment.

As illustrated in FIG. 12, the first tilt sensors 601, 603, and 604 are preferably positioned on the front wheel side and the rear wheel side of the sensor PKG housing 3 when the subject vehicle is divided into two regions, the front wheel side and the rear wheel side. In the example of FIG. 12, the first tilt sensor 601 is placed on the front wheel side, and the first tilt sensors 603 and 604 are placed on the rear wheel side. The first tilt sensors 603 and 604 are positioned separately on the right rear wheel side and the left rear wheel side of the sensor PKG housing 3 when the subject vehicle is divided into four regions, the right front wheel side, the left front wheel side, the right rear wheel side, and the left rear wheel side. Specifically, the first tilt sensor 603 is placed on the right rear wheel side, and the first tilt sensor 604 is placed on the left rear wheel side. This makes it possible to more accurately detect tilts of the sensor PKG housing 3 from the initial position exclusive of the influence of tilts of the subject vehicle due to air suspension or tire pressure from only on either the right rear wheel side or the left rear wheel side.

The example of FIG. 12 illustrates the configuration of placing one first tilt sensor 6c on the front wheel side and two first tilt sensors 6c on the rear wheel side. However, the configuration is not necessarily limited thereto. It may be favorable to place two first tilt sensors 6c on the front wheel side, and one on the rear wheel side. In this case, it is preferable to place the first tilt sensors 6c on the front wheel side toward the right rear wheel side and the left rear wheel side separately. This makes it possible to more accurately detect tilts of the sensor PKG housing 3 from the initial position exclusive of the influence of tilts of the subject vehicle due to air suspension or tire pressure from only on either the right front wheel side or the left front wheel side.

As illustrated in FIG. 12, the second tilt sensors 801, 803, and 804 are preferably placed on the front wheel side and the rear wheel side when the subject vehicle is divided into two regions, the front wheel side and the rear wheel side. In the example of FIG. 12, the second tilt sensor 801 is placed on the front wheel side, and the second tilt sensors 803 and 804 are placed on the rear wheel side. The second tilt sensors 803 and 804 are placed separately on the right rear wheel side and the left rear wheel side when the subject vehicle is divided into four regions, the right front wheel side, the left front wheel side, the right rear wheel side, and the left rear wheel side. Specifically, the second tilt sensor 803 is placed on the right rear wheel side, and the second tilt sensor 804 is placed on the left rear wheel side. This makes it possible to more accurately detect tilts of the sensor PKG housing 3 from the initial position exclusive of the influence of tilts of the subject vehicle due to air suspension or tire pressure from only on either the right rear wheel side or the left rear wheel side.

The example of FIG. 12 illustrates the configuration of placing one second tilt sensor 8c on the front wheel side and two second tilt sensors 8c on the rear wheel side. However, the configuration is not necessarily limited thereto. It may be favorable to place two second tilt sensors 8c on the front wheel side, and one on the rear wheel side. In this case, it is preferable to place the second tilt sensors 8c on the front wheel side toward the right rear wheel side and the left rear wheel side separately. This makes it possible to more accurately detect tilts of the sensor PKG housing 3 from the initial position exclusive of the influence of tilts of the subject vehicle due to air suspension or tire pressure from only on either the right front wheel side or the left front wheel side.

Schematic Configuration of the Image Processing Device 7C

The description below explains the schematic configuration of the image processing device 7c by reference to FIGS. 11 and 13. As illustrated in FIG. 11, the image processing device 7c is an electronic control device that is mainly composed of an arithmetic circuit including a processing portion 71c, RAM 72, the storage portion 73, and the I/O 74. The image processing device 7c is similar to the image processing device 7b according to the third embodiment except that a processing portion 71c is included instead of the processing portion 71b.

Figure 13:
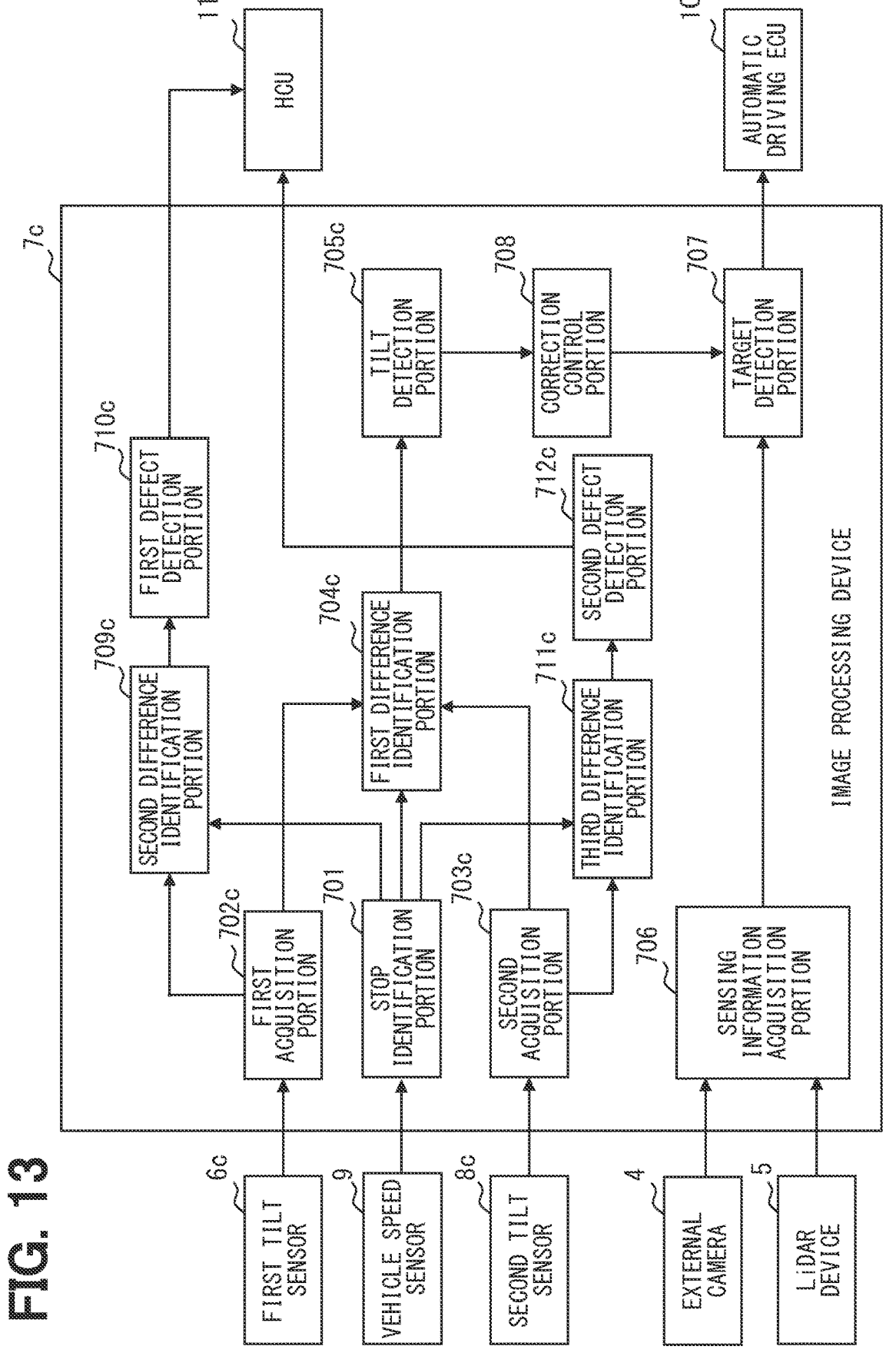
FIG. 13 is a diagram illustrating a schematic configuration of an image processing device.

As illustrated in FIG. 13, the image processing device 7c includes functional blocks such as the stop identification portion 701, a first acquisition portion 702c, a second acquisition portion 703c, a first difference identification portion 704c, a tilt detection portion 705c, the sensing information acquisition portion 706, the target detection portion 707, the correction control portion 708, a second difference identification portion 709c, a first defect detection portion 710c, the third difference identification portion 711c and a second defect detection portion 712c. The image processing device 7c is also comparable to the tilt detection device. The computer executes processes of the functional blocks of the image processing device 7bc. This is also comparable to the execution of the tilt detection method. The functional blocks of the image processing device 7c are similar to those of the image processing device 7b according to the third embodiment except that the first acquisition portion 702c, the second acquisition portion 703c, the first difference identification portion 704c, the tilt detection portion 705c, the second difference identification portion 709c, the first defect detection portion 710c, a third difference identification portion 711c, and the second defect detection portion 712c instead of a first acquisition portion 702b, a second acquisition portion 703b, a first difference identification portion 704b, a tilt detection portion 705b, the second difference identification portion 709, the first defect detection portion 710, a third difference identification portion 711, and the second defect detection portion 712.

The first acquisition portion 702c acquires the first tilt information detected by the multiple first tilt sensors 6c. The example according to the present embodiment acquires the first tilt information from the first tilt sensors 601, 603 and 604. The process in the first acquisition portion 702c is also comparable to a first acquisition step. The second acquisition portion 703c acquires the second tilt information detected by the multiple second tilt sensors 8c. The example according to the present embodiment acquires the second tilt information from the second tilt sensors 801, 803 and 804. The process in the second acquisition portion 703c is also comparable to a second acquisition step.

Similar to the second difference identification portion 709, the second difference identification portion 709c identifies the second difference, a tilt difference among multiple first tilt sensors 6c referring to the common reference state based on the first tilt information, acquired by the first acquisition portion 702c, about the multiple first tilt sensors 6c. The example of the present embodiment identifies the second difference for the set of first tilt sensor 601 and first tilt sensor 603, the set of first tilt sensor 601 and first tilt sensor 604, and the set of first tilt sensor 603 and first tilt sensor 604.

The first defect detection portion 710c detects a defect of the first tilt sensor 6c when the second difference identification portion 709c identifies that at least one of the second differences among multiple sets of the first tilt sensor 6c does not fall inside the second allowable range described above. The first defect detection portion 710c detects no defect of the first tilt sensor 6c when the second difference identification portion 709c identifies that any of the second differences among multiple sets of the first tilt sensor 6c falls inside the second allowable range.

The first defect detection portion 710c detects which of the first tilt sensors 6c is faulty based on which set of the first tilt sensors 6c causes the second difference, a tilt difference between the first tilt sensors 6c, to fall outside the second allowable range. Specifically, the first defect detection portion 710c detects a defect of the first tilt sensor 6c that is always included in the set whose second difference does not fall inside the second allowable range. For example, the first tilt sensor 601 may be detected to be faulty when the second difference between the set of first tilt sensor 601 and first tilt sensor 603 and the set of first tilt sensor 601 and first tilt sensor 604 does not fall inside the second allowable range and, meanwhile, the second difference between the set of first tilt sensor 603 and first tilt sensor 604 falls inside the second allowable range. It is possible to detect a defect by individually identifying the first tilt sensor 6c causing the defect.

When identifying and detecting a defect of each first tilt sensor 6c, the first defect detection portion 710c may notify the HCU 11 of the defect occurrence so that the HCU 11 allows the presentation device 12 to provide the relevant information.

For example, an icon may be displayed to indicate which of the multiple first tilt sensors 6c causes a defect. Alternatively, diagnostic information may be recorded for a diagnostic tool to read. This makes it easy to take appropriate action against the defect of each first tilt sensor 6c.

Similar to the third difference identification portion 711, the third difference identification portion 711c identifies the third difference, a tilt difference among the multiple second tilt sensors 8c referring to the common reference state based on the second tilt information, acquired by the second acquisition portion 703c, about the multiple second tilt sensors 8c. The example of the present embodiment identifies the third difference for the set of second tilt sensor 801 and second tilt sensor 803, the set of second tilt sensor 801 and second tilt sensor 804, and the set of second tilt sensor 803 and second tilt sensor 804.

The second defect detection portion 712c detects a defect of the second tilt sensor 8c when the third difference identification portion 711c identifies that at least one of the third differences among multiple sets of the second tilt sensor 8c does not fall inside the third allowable range described above. The second defect detection portion 712c detects no defect of the second tilt sensor 8c when the third difference identification portion 711c identifies that any of the third differences in multiple sets of second tilt sensor 8c falls inside the third allowable range.

The second defect detection portion 712c detects which of the second tilt sensors 8c is faulty based on which set of the second tilt sensors 8c causes the third difference, a tilt difference between the second tilt sensors 8c, to fall outside the third allowable range. Specifically, the second defect detection portion 712c detects a defect of the second tilt sensor 8c that is always included in the set whose third difference does not fall inside the third allowable range. For example, the second tilt sensor 801 may be detected to be faulty when the third difference between the set of second tilt sensor 801 and second tilt sensor 803 and the set of second tilt sensor 801 and second tilt sensor 804 does not fall inside the third allowable range and, meanwhile, the third difference between the set of second tilt sensor 803 and second tilt sensor 804 falls inside the third allowable range. It is possible to detect a defect by individually identifying the second tilt sensor 8c causing the defect.

When identifying and detecting a defect of each second tilt sensor 8c, the second defect detection portion 712c may notify the HCU 11 of the defect detection so that the HCU 11 allows the presentation device 12 to provide the relevant information. For example, an icon may be displayed to indicate which of the multiple second tilt sensors 8c causes a defect. Alternatively, diagnostic information may be recorded for a diagnostic tool to read. This makes it easy to take appropriate action against the defect of each second tilt sensor 8c.

Similar to the first difference identification portion 704b, the first difference identification portion 704c may identify the first difference, a difference between the tilt of the moving object and the tilt of the sensor PKG housing 3 referring to the common reference state based on the first tilt information acquired by the first acquisition portion 702c and the second tilt information acquired by the second acquisition portion 703c. The process in the first difference identification portion 704c is also comparable to the first difference identification step. There may be a configuration in which the first difference identification portion 704c calculates a tilt difference between sets of more closely positioned first tilt sensors 6c and second tilt sensors 8c and identifies an average of differences in the sets as the first difference. A possible solution follows. The example according to the present embodiment may calculate a tilt difference in each of the set of first tilt sensor 601 and second tilt sensor 801, the set of first tilt sensor 603 and second tilt sensor 803, and the set of first tilt sensor 604 and second tilt sensor 804.

Similar to the tilt detection portion 705b, the tilt detection portion 705c may detect that the sensor PKG housing 3 tilts from the initial position when the second difference identified by the second difference identification portion 709c falls inside the second allowable range, the third difference identified by the third difference identification portion 711c falls inside the third allowable range, and the first difference identified by the first difference identification portion 704c does not fall inside the first allowable range.

Tilt Detection Process in the Processing Portion 71C

Figure 14:
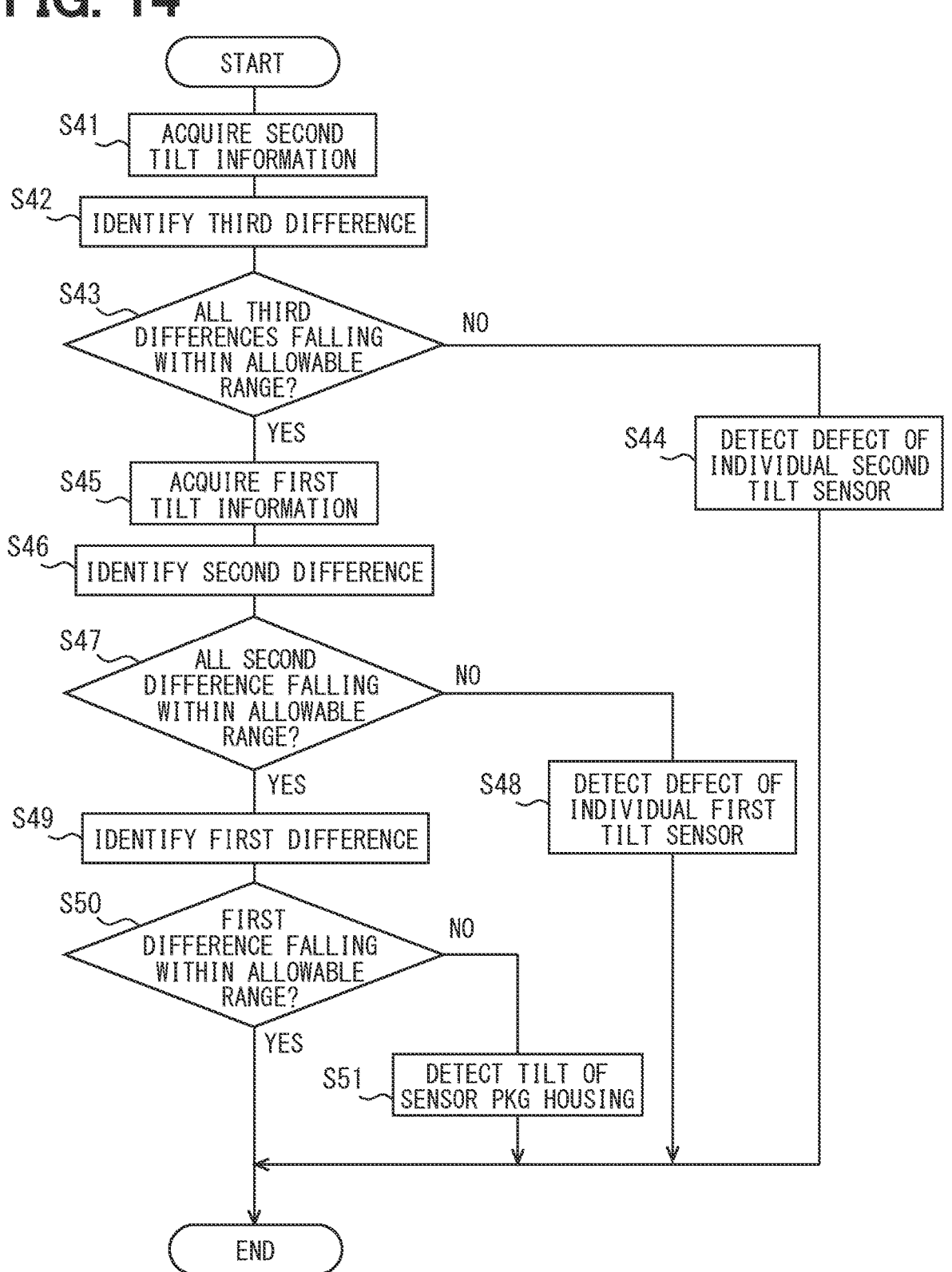
FIG. 14 is a flowchart illustrating the flow of a tilt detection process in a processing portion.

The description below explains an example of the tilt detection process in the processing portion 71c by reference to the flowchart in FIG. 14. The flowchart in FIG. 14 may start under conditions similar to those of the flowchart in FIG. 5.

At step S41, the second acquisition portion 703c acquires the second tilt information detected by each of the second tilt sensors 8c. At step S42, the third difference identification portion 711c identifies the third difference, a tilt difference between the second tilt sensors 8c referring to the common reference state, for each combination of second tilt sensors 8c based on the second tilt information about the multiple second tilt sensors 8c acquired at S41.

At step S43, all the third differences in the sets identified at S42 may fall inside the third allowable range (YES in S43). Then, the process proceeds to step S45. None of the sets of third differences identified at S42 may fall inside the third allowable range (NO in S43). Then, the process proceeds to step S44. At step S44, the second defect detection portion 712c detects which of the second tilt sensors 8c is faulty, based on which set of second tilt sensors 8c causes the third difference to fall outside the third allowable range. Then, the tilt detection process terminates.

At step S45, the first acquisition portion 702c acquires the first tilt information detected by each of the first tilt sensors 6c. At step S46, the second difference identification portion 709c identifies the second difference, a tilt difference between the first tilt sensors 6c referring to the common reference state, for each combination of first tilt sensors 6c based on the first tilt information on multiple first tilt sensor 6c acquired at S45.

At step S47, all the second differences in the sets identified at S42 may fall inside the second allowable range (YES in S47). Then, the process proceeds to step S49. None of the sets of second differences identified at S46 may fall inside the second allowable range (NO in S47). Then, the process proceeds to step S48. At step S48, the first defect detection portion 710c detects which of the first tilt sensors 6c is faulty, based on which set of first tilt sensors 6c causes the second difference to fall outside the second allowable range. Then, the tilt detection process terminates.

At step S49, the first difference identification portion 704c identifies the first difference based on the second tilt information acquired at S41 and the first tilt information acquired at S45. The first difference represents a difference between the tilt of the moving object and the tilt of sensor PKG housing 3 referring to the common reference state.

At step S50, the first difference identified at S49 may fall inside the first allowable range (YES at S50). Then, the tilt detection process terminates. In this case, the tilt detection portion 705c may detect that the sensor PKG housing 3 does not tilt from the initial position. The first difference identified at S49 does not fall inside the first allowable range (NO at S50). Then, the process proceeds to step S51. At step S51, the tilt detection portion 705c detects that the sensor PKG housing 3 tilts from the initial position, and performs the tilt detection process.

Overview of the Fourth Embodiment

The fourth embodiment also detects that the sensor PKG housing 3 tilts from the initial position when the first difference, a difference between the tilt of the subject vehicle and the tilt of the sensor PKG housing 3 referring to the common reference state, does not fall inside the first allowable range. Similar to the first embodiment, it is possible to highly accurately detect the tilt of the sensor PKG housing 3, mounted on the subject vehicle, from the initial position.

The fourth embodiment has described the example of using three first tilt sensors 6c and three second tilt sensors 8c. However, the present disclosure is not necessarily limited thereto. For example, the number of first tilt sensors 6c may differ from the number of second tilt sensors 8c. It may be favorable to combine the configuration of the fourth embodiment and the configuration of the second embodiment.

Fifth Embodiment

The four embodiment illustrates the configuration that uses three first tilt sensors 6 and three second tilt sensors 8. However, the present disclosure is not necessarily limited thereto. For example, there may be a configuration (fifth embodiment) that uses four first tilt sensors 6 and four second tilt sensors 8. The description below explains the configuration according to the fifth embodiment. For convenience sake, the fifth embodiment denotes the first tilt sensor 6 as a first tilt sensor 6d and the second tilt sensor 8 as a second tilt sensor 8d.

Schematic Configuration of the Vehicular System 1D

Figure 15:
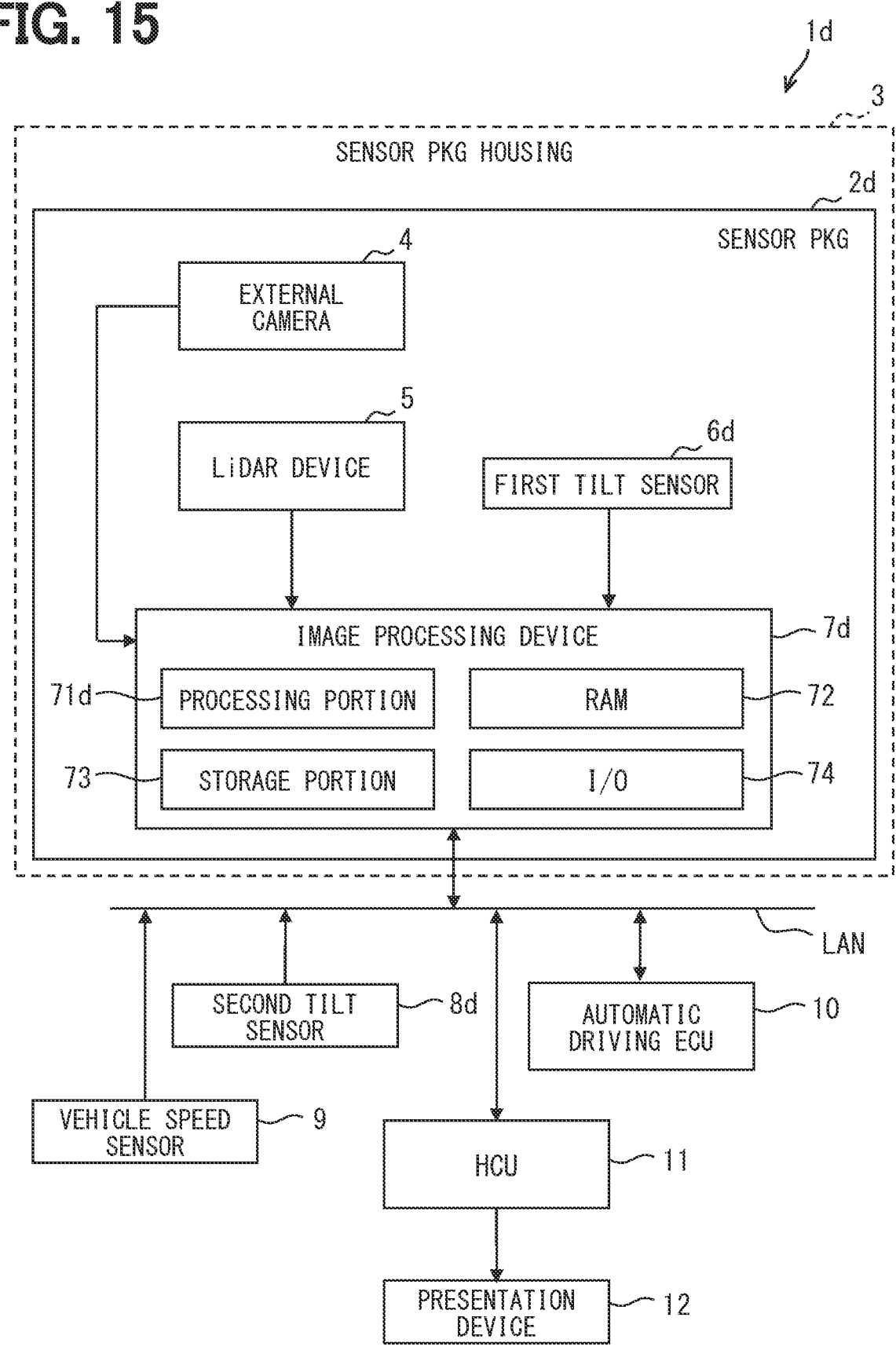
FIG. 15 is a diagram illustrating a schematic configuration of a vehicle system.

The vehicular system 1c can be used for vehicles. As illustrated in FIG. 15, a vehicular system 1d includes a sensor PKG 2d, a second tilt sensor 8d, the vehicle speed sensor 9, the automatic driving ECU 10, the HCU 11, and the presentation device 12. The vehicular system 1d is similar to the vehicular system 1 according to the first embodiment except that the sensor PKG 2d is included instead of the sensor PKG 2, and the second tilt sensor 8d is included instead of the second tilt sensor 8.

The second tilt sensor 8d is similar to the second tilt sensor 8 according to the first embodiment except that four second tilt sensors 8d are used. As illustrated in FIG. 15, the sensor PKG 2d includes the external camera 4, the LiDAR device 5, a first tilt sensor 6d, and an image processing device 7c. The sensor PKG 2d is similar to the sensor PKG 2 according to the first embodiment except that the first tilt sensor 6d and the image processing device 7d are included instead of the first tilt sensor 6 and the image processing device 7. A schematic configuration of the image processing device 7d will be described later. The first tilt sensor 6d is similar to the first tilt sensor 6 according to the first embodiment except that four first tilt sensors 6d are used. A configuration including the sensor PKG 2d and the second tilt sensor 8d also corresponds to the tilt detection system.

By reference to FIG. 16, the description below explains an arrangement of the external camera 4, the LiDAR device 5, the first tilt sensor 6d, and the second tilt sensor 8d according to the fifth embodiment. As above, the sensor PKG housing 3 is assumed to have an approximately rectangular shape along the top surface of the roof of the subject vehicle. The placement of the external camera 4 and the LiDAR device 5 is similar to that described in the first embodiment by reference to FIG. 2.

Four first tilt sensors 6d are provided inside the sensor PKG housing 3. Below, the four first tilt sensors 6d are denoted as first tilt sensor 605, first tilt sensor 606, first tilt sensor 607, and first tilt sensor 608. The four second tilt sensors 8d are provided for the subject vehicle except for the sensor PKG housing 3. In the description below, the four second tilt sensors 8d are referred to as second tilt sensors 805, 806, 807 and 808.

Figure 16:
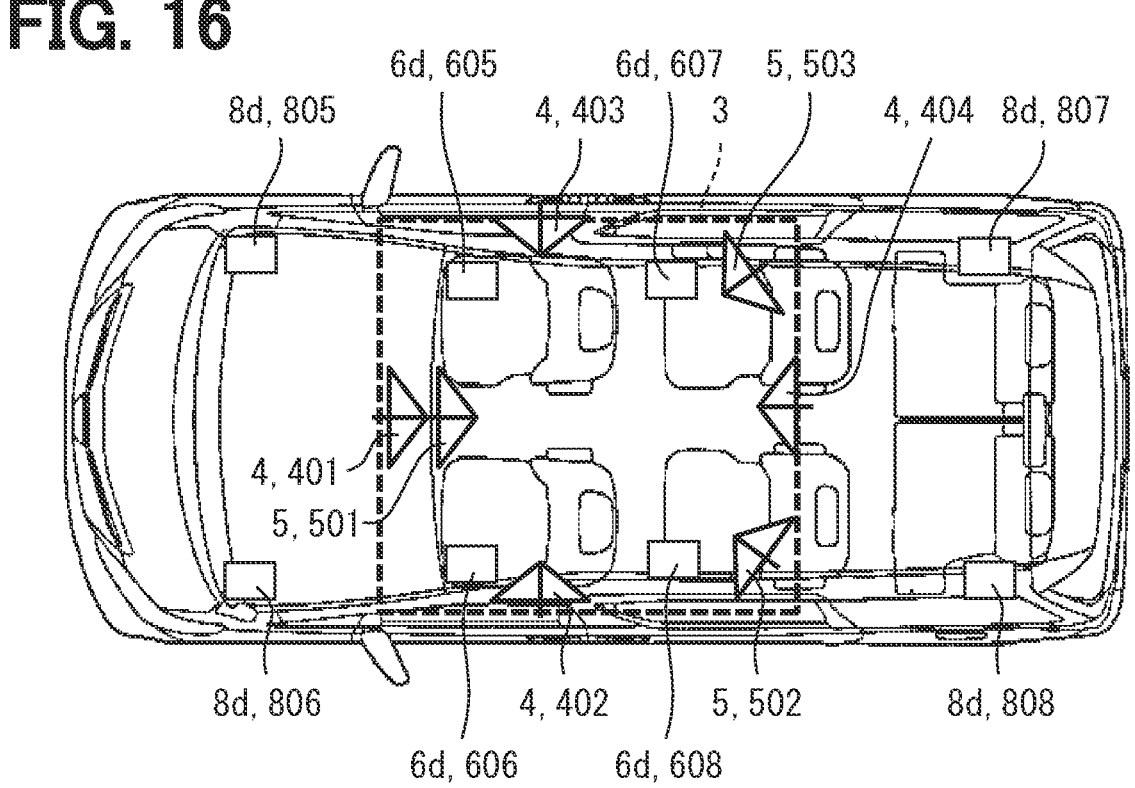
FIG. 16 is a diagram illustrating an arrangement of the external camera, the LiDAR device, a first tilt sensor, and a second tilt sensor according to a fifth embodiment.

As illustrated in FIG. 16, the first tilt sensor 605, the first tilt sensor 606, the first tilt sensor 607, and the first tilt sensor 608 are preferably positioned at the right front wheel side, the left front wheel side, the right rear wheel side, and the left rear wheel side, respectively, of the sensor PKG housing 3 when the subject vehicle is divided into four regions corresponding to these four sides. According to the example in FIG. 16, the first tilt sensor 605 is placed on the right front wheel side, the first tilt sensor 606 on the left front wheel side, the first tilt sensor 607 on the right rear wheel side, and the first tilt sensor 608 on the left rear wheel side. This makes it possible to more accurately detect tilts of the sensor PKG housing 3 from the initial position exclusive of the influence of tilts of the subject vehicle due to air suspension or tire pressure from only one of the right front wheel side, the left front wheel side, the right rear wheel side, and the left rear wheel side.

As illustrated in FIG. 16, the second tilt sensor 805, the second tilt sensor 806, the second tilt sensor 807, and the second tilt sensor 808 are preferably positioned on the right front wheel side, the left front wheel side, the right rear wheel side, and the left rear wheel side, respectively, when the subject vehicle is divided into four regions corresponding to these four sides. According to the example in FIG. 16, the second tilt sensor 805 is placed on the right front wheel side, the second tilt sensor 806 on the left front wheel side, the second tilt sensor 807 on the right rear wheel side, and the second tilt sensor 808 on the left rear wheel side. This makes it possible to more accurately detect tilts of the sensor PKG housing 3 from the initial position exclusive of the influence of tilts of the subject vehicle due to air suspension or tire pressure from only one of the right front wheel side, the left front wheel side, the right rear wheel side, and the left rear wheel side.

Schematic Configuration of the Image Processing Device 7d

The description below explains the schematic configuration of the image processing device 7d by reference to FIGS. 15 and 17. As illustrated in FIG. 15, the image processing device 7d is an electronic control device that is mainly composed of an arithmetic circuit including a processing portion 71d, RAM 72, the storage portion 73, and the I/O 74. The image processing device 7d is similar to the image processing device 7c according to the third embodiment except that the processing portion 71d is provided instead of the processing portion 71c.

Figure 17:
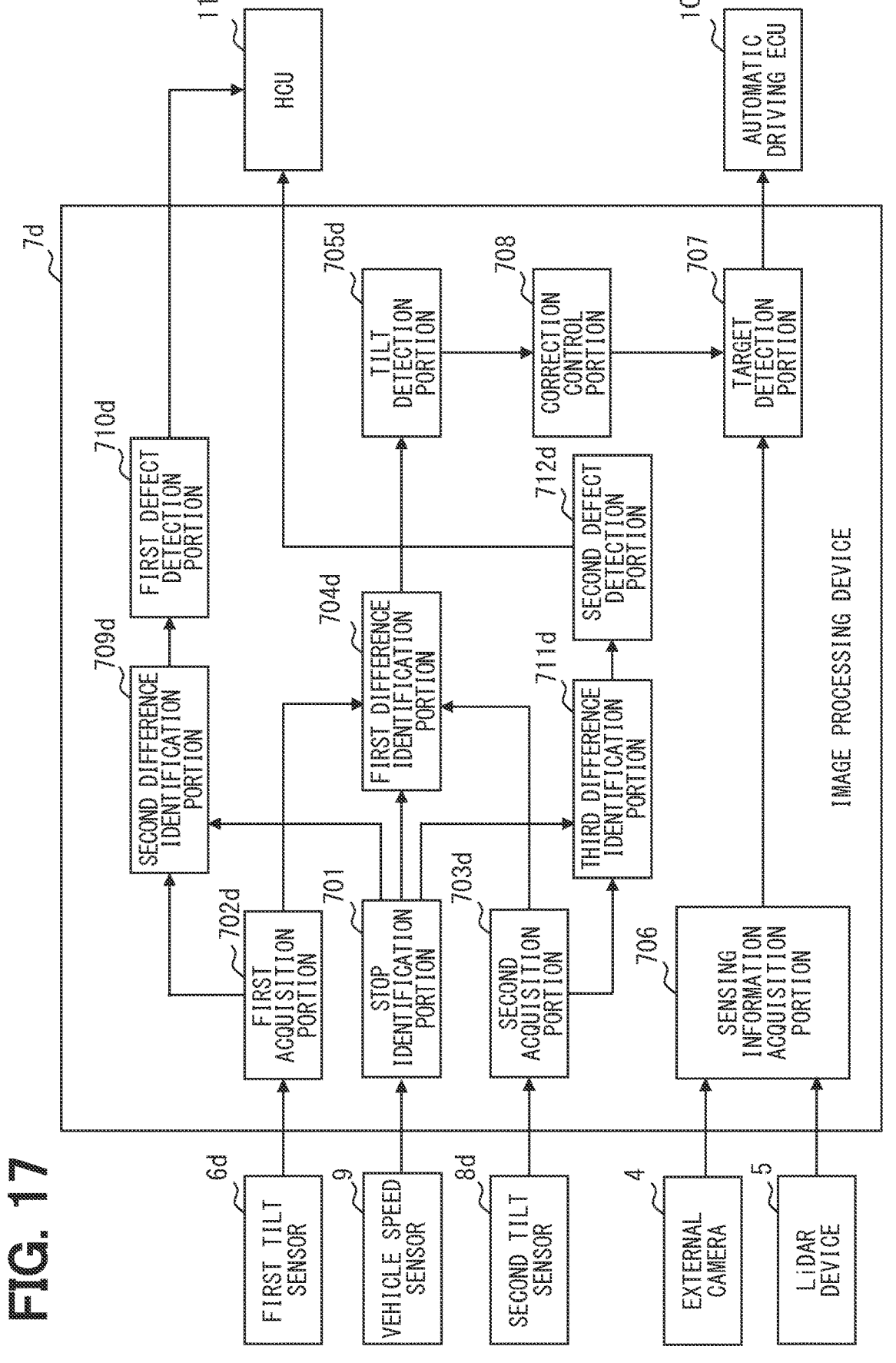
FIG. 17 is a diagram illustrating a schematic configuration of an image processing device.

As illustrated in FIG. 17, the image processing device 7d includes functional blocks such as the stop identification portion 701, a first acquisition portion 702d, a second acquisition portion 703d, a first difference identification portion 704d, a tilt detection portion 705d, the sensing information acquisition portion 706, the target detection portion 707, the correction control portion 708, a second difference identification portion 709d, a first defect detection portion 710d, a third difference identification portion 711d and a second defect detection portion 712d. The image processing device 7d is also comparable to the tilt detection device. The computer executes processes of the functional blocks of the image processing device 7d. This is also comparable to the execution of the tilt detection method. The functional blocks of the image processing device 7d are similar to those of the image processing device 7c according to the fourth embodiment except that the first acquisition portion 702d, the second acquisition portion 703d, the first difference identification portion 704d, the tilt detection portion 705d, the second difference identification portion 709d, the first defect detection portion 710d, the third difference identification portion 711d, and the second defect detection portion 712d are provided instead of the first acquisition portion 702c, the second acquisition portion 703c, the first difference identification portion 704c, the tilt detection portion 705c, the second difference identification portion 709c, the first defect detection portion 710c, the third difference identification portion 711c, and the second defect detection portion 712c.

The first acquisition portion 702d acquires the first tilt information detected by the multiple first tilt sensors 6d. The example according to the present embodiment acquires the first tilt information from the first tilt sensors 605, 606, 607 and 608. The process in the first acquisition portion 702d is also comparable to a first acquisition step. The second acquisition portion 703d acquires the second tilt information detected by the multiple second tilt sensors 8d. The example according to the present embodiment acquires the second tilt information from the second tilt sensors 805, 806, 807 and 808. The process in the second acquisition portion 703d is also comparable to a second acquisition step.

The second difference identification portion 709d is similar to the second difference identification portion 709c according to the third embodiment except for an increase in the number of combinations to identify differences. The example of the present embodiment identifies the second difference for the set of first tilt sensor 605 and first tilt sensor 606, the set of first tilt sensor 605 and first tilt sensor 607, the set of first tilt sensor 605 and first tilt sensor 608, the set of first tilt sensor 606 and first tilt sensor 607, the set of first tilt sensor 606 and first tilt sensor 608, and the set of first tilt sensor 607 and first tilt sensor 608. The first defect detection portion 710d is similar to the first defect detection portion 710c according to the fourth embodiment except for the number of sets to identify the second difference.

The third difference identification portion 711d is similar to the third difference identification portion 711c according to the third embodiment except for an increase in the number of combinations to identify differences. The example of the present embodiment identifies the third difference for the set of second tilt sensor 805 and second tilt sensor 806, the set of second tilt sensor 805 and second tilt sensor 807, the set of second tilt sensor 805 and second tilt sensor 808, the set of second tilt sensor 806 and second tilt sensor 807, the set of second tilt sensor 806 and second tilt sensor 808, and the set of second tilt sensor 807 and second tilt sensor 808. The second defect detection portion 712d is similar to the second defect detection portion 712c according to the fourth embodiment except for the number of sets to identify the third difference.

Similar to the tilt detection portion 705c, the tilt detection portion 705d may detect that the sensor PKG housing 3 tilts from the initial position when the second difference identified by the second difference identification portion 709d falls inside the second allowable range, the third difference identified by the third difference identification portion 711d falls inside the third allowable range, and the first difference identified by the first difference identification portion 704d does not fall inside the first allowable range.

Overview Of The Fifth Embodiment

The fifth embodiment also detects that the sensor PKG housing 3 tilts from the initial position when the first difference, a difference between the tilt of the subject vehicle and the tilt of the sensor PKG housing 3 referring to the common reference state, does not fall inside the first allowable range. Similar to the first embodiment, it is possible to highly accurately detect the tilt of the sensor PKG housing 3, mounted on the subject vehicle, from the initial position.

The fifth embodiment has described the example of using four first tilt sensors 6d and four second tilt sensors 8d. However, the present disclosure is not necessarily limited thereto. For example, it may be favorable to use five or more first tilt sensors 6d and second tilt sensors 8d. For example, the number of first tilt sensors 6d may differ from the number of second tilt sensors 8d. It may be favorable to combine the configuration of the fifth embodiment and the configuration of the second embodiment.

Sixth Embodiment

Figure 18:
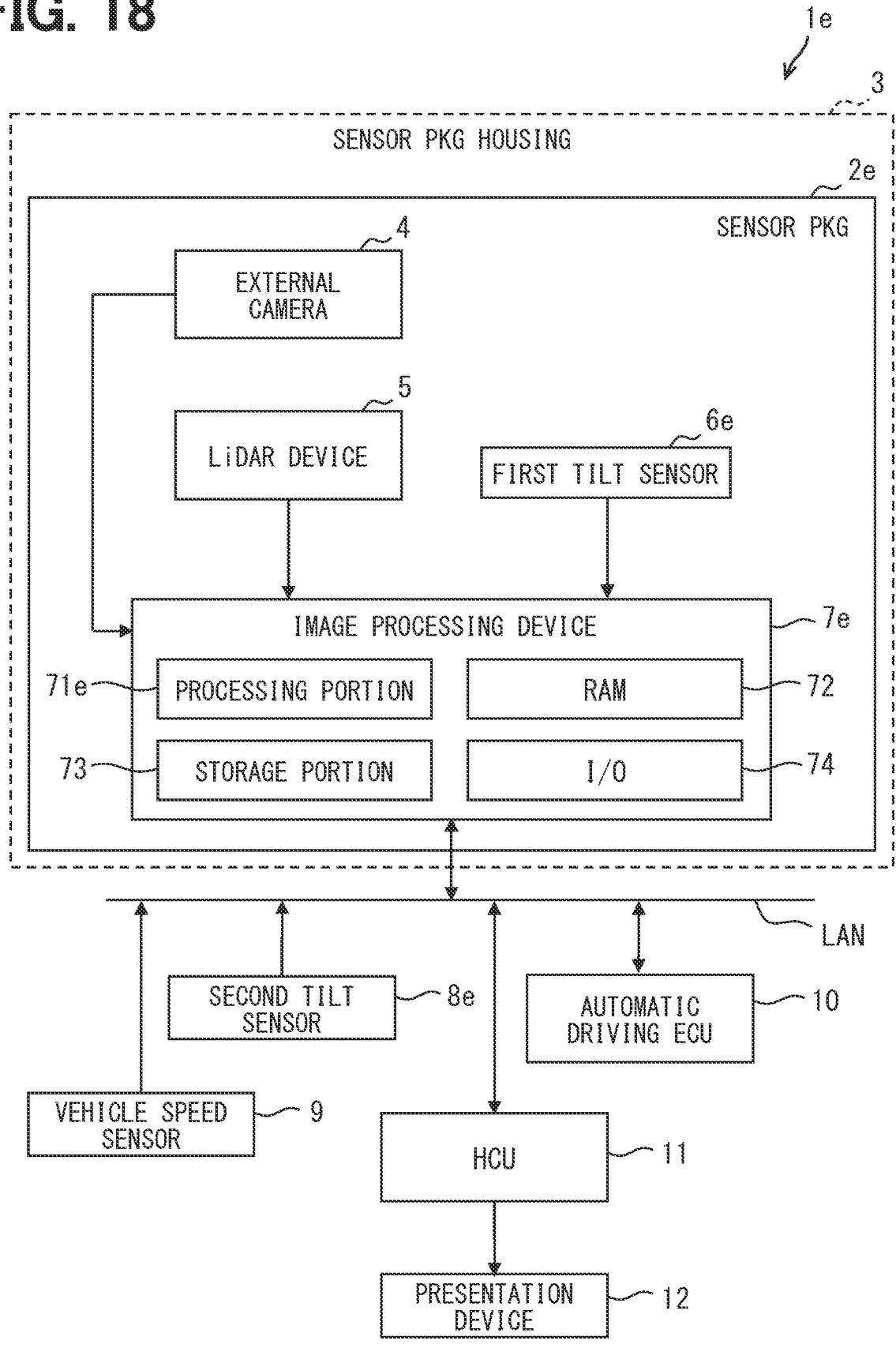
FIG. 18 is a diagram illustrating a schematic configuration of a vehicle system.

As above, the fifth embodiment illustrates the configuration of providing the first tilt sensor 6 for the sensor PKG housing 3. There may be a configuration (sixth embodiment) of providing the first tilt sensor 6 for the peripheral monitoring sensor included in the sensor PKG housing 3. The description below explains the configuration according to the sixth embodiment. For convenience sake, the sixth embodiment denotes the first tilt sensor 6 as a first tilt sensor 6e and the second tilt sensor 8 as a second tilt sensor 8e. Schematic Configuration of the Vehicular System 1E The vehicular system 1e can be used for vehicles. As illustrated in FIG. 18, a vehicular system 1e includes a sensor PKG 2e, a second tilt sensor 8e, the vehicle speed sensor 9, the automatic driving ECU 10, the HCU 11, and the presentation device 12. The vehicular system 1e is similar to the vehicular system 1 according to the first embodiment except that the sensor PKG 2e is included instead of the sensor PKG 2 and the second tilt sensor 8e is included instead of the second tilt sensor 8.

It may be favorable to use one or more second tilt sensors 8e. The present embodiment will be described through the use of two second tilt sensors 8b similar to the third embodiment. As illustrated in FIG. 18, the sensor PKG 2e includes the external camera 4, the LiDAR device 5, a first tilt sensor 6e, and an image processing device 7e. The sensor PKG 2e is similar to the sensor PKG 2 according to the first embodiment except that the first tilt sensor 6e and the image processing device 7e are included instead of the first tilt sensor 6 and the image processing device 7. A schematic configuration of the image processing device 7e will be described later. The first tilt sensor 6e is similar to the first tilt sensor 6 according to the first embodiment except that the first tilt sensor 6e is provided for the peripheral monitoring sensor included in the sensor PKG housing 3. A configuration including the sensor PKG 2e and the second tilt sensor 8b also corresponds to the tilt detection system.

Figure 19:
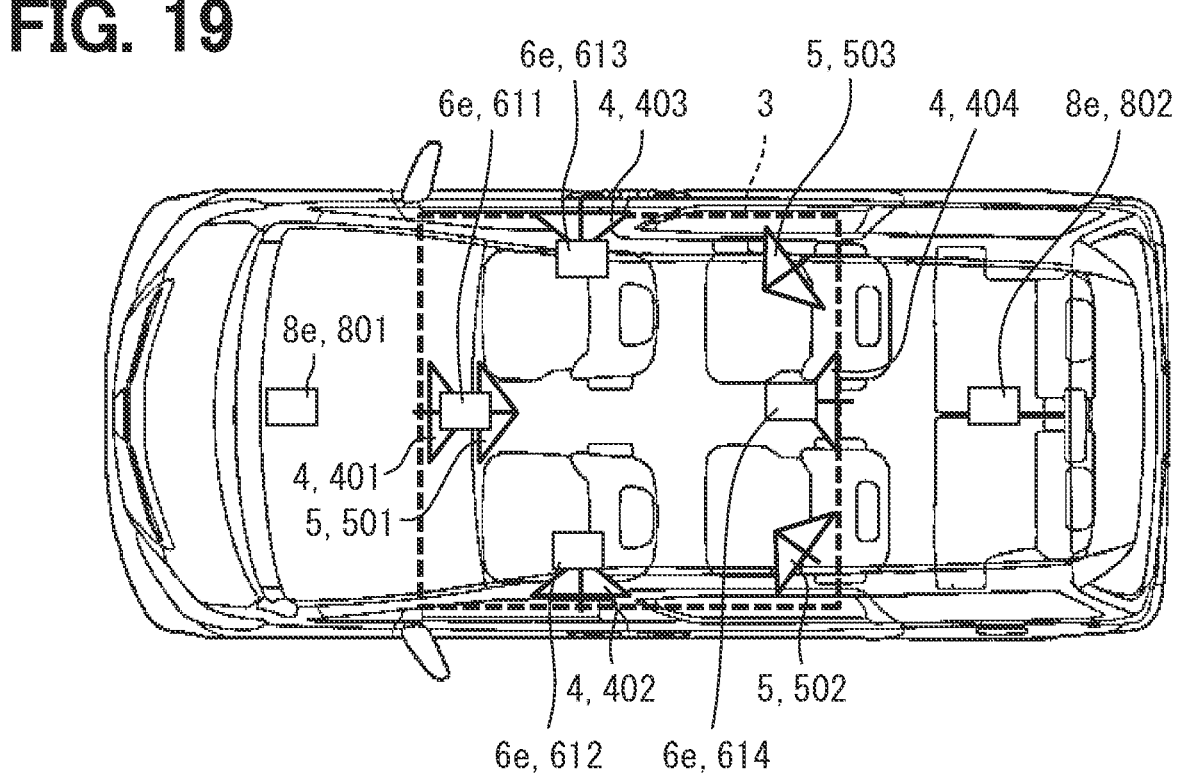
FIG. 19 is a diagram illustrating an arrangement of the external camera, the LiDAR device, a first tilt sensor, and a second tilt sensor according to a sixth embodiment.

By reference to FIG. 19, the description below explains an arrangement of the external camera 4, the LiDAR device 5, the first tilt sensor 6e, and the second tilt sensor 8e according to the sixth embodiment. As above, the sensor PKG housing 3 is assumed to have an approximately rectangular shape along the top surface of the roof of the subject vehicle. The placement of the external camera 4 and the LiDAR device 5 is similar to that described in the first embodiment by reference to FIG. 2.

The first tilt sensor 6e is provided for each of the external cameras 4 included in the sensor PKG housing 3. The example of the present embodiment uses four external cameras 4, external cameras 401 through 404, and therefore uses four first tilt sensors 6e. In the description below, the four first tilt sensors 6e are referred to as first tilt sensors 612, 613 and 614. The first tilt sensor 611 is provided for the external camera 401. The first tilt sensor 612 is provided for the external camera 402. The first tilt sensor 613 is provided for the external camera 403. The first tilt sensor 614 is provided for the external camera 404.

The first tilt sensor 6e may be provided for each of the peripheral monitoring sensors included in the sensor PKG housing 3. Namely, the example of the present embodiment may provide the first tilt sensor 6e for each LiDAR device 5.

The two second tilt sensors 8c are provided for the subject vehicle except for the sensor PKG housing 3. The two second tilt sensors 8e are placed similarly to the second tilt sensor 8b and are hereinafter referred to as second tilt sensor 801 and second tilt sensor 802.

Schematic Configuration of the Image Processing Device 7E

The description below explains the schematic configuration of the image processing device 7e by reference to FIGS. 18 and 20. As illustrated in FIG. 18, the image processing device 7e is an electronic control device that is mainly composed of an arithmetic circuit including a processing portion 71e, RAM 72, the storage portion 73, and the I/O 74. The image processing device 7e is similar to the image processing device 7b according to the third embodiment except that the processing portion 71e is provided instead of the processing portion 71b.

Figure 20:
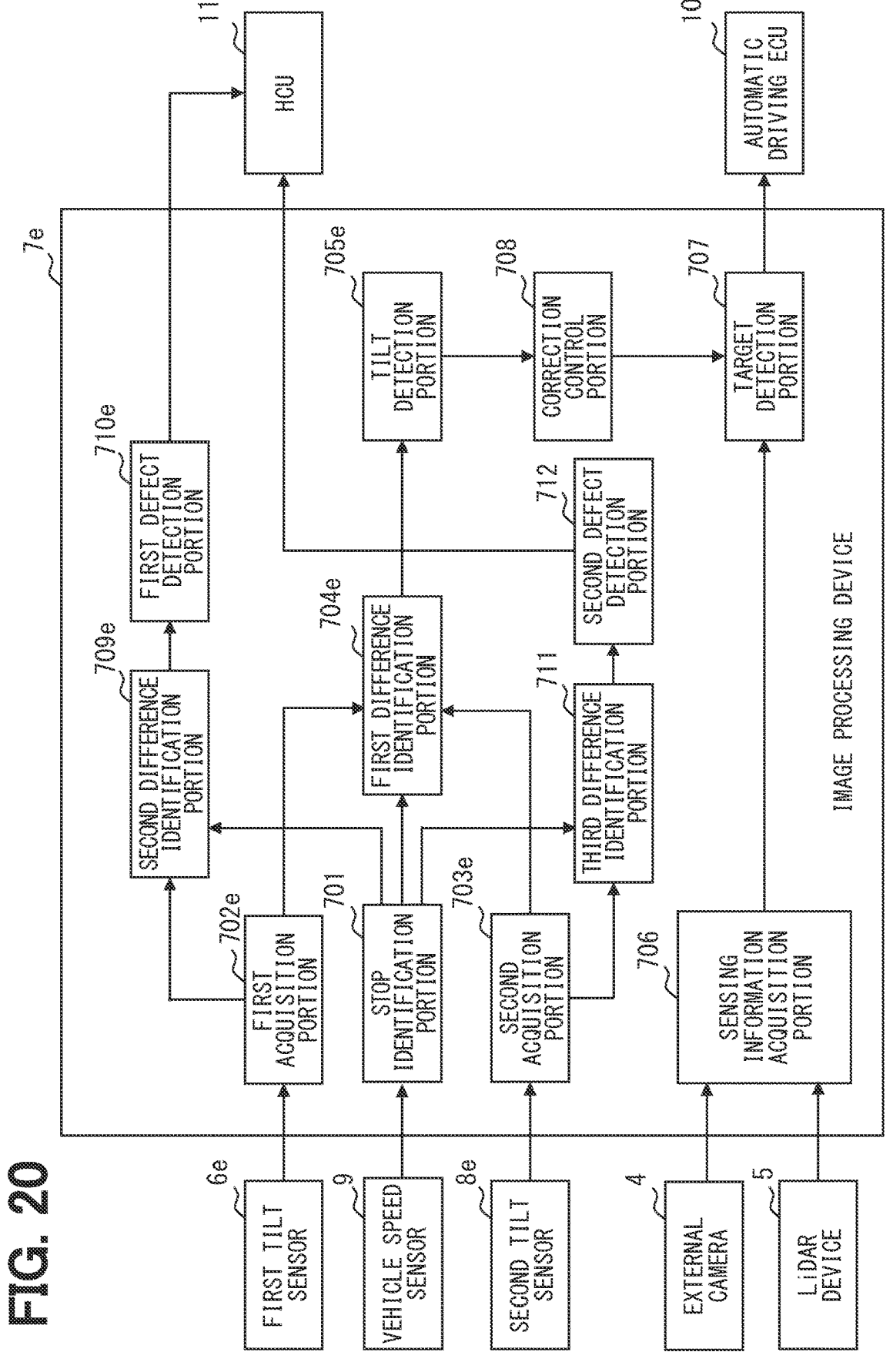
FIG. 20 is a diagram illustrating a schematic configuration of an image processing device.

As illustrated in FIG. 20, the image processing device 7e includes functional blocks such as the stop identification portion 701, a first acquisition portion 702e, a second acquisition portion 703e, a first difference identification portion 704e, a tilt detection portion 705e, the sensing information acquisition portion 706, the target detection portion 707, the correction control portion 708, a second difference identification portion 709e, a first defect detection portion 710e, a third difference identification portion 711 and the second defect detection portion 712. The image processing device 7e is also comparable to the tilt detection device. The computer executes processes of the functional blocks of the image processing device 7e. This is also comparable to the execution of the tilt detection method. The functional blocks of the image processing device 7e are similar to those of the image processing device 7b according to the third embodiment except that the first acquisition portion 702e, the second acquisition portion 703e, the first difference identification portion 704e, the tilt detection portion 705e, the second difference identification portion 709e, and the first defect detection portion 710e are provided instead of the first acquisition portion 702b, a second acquisition portion 703b, the first difference identification portion 704b, the tilt detection portion 705b, the second difference identification portion 709, and the first defect detection portion 710.

The first acquisition portion 702e acquires the first tilt information detected by the multiple first tilt sensors 6e. The example according to the present embodiment acquires the first tilt information from the first tilt sensors 611, 612, 613 and 614. The process in the first acquisition portion 702e is also comparable to a first acquisition step. The second acquisition portion 703e acquires the second tilt information detected by the multiple second tilt sensors 8e. The example according to the present embodiment acquires the second tilt information from the second tilt sensors 801 and 802. The process in the second acquisition portion 703e is also comparable to a second acquisition step.

Similar to the second difference identification portion 709, the second difference identification portion 709e identifies the second difference, a tilt difference among the multiple first tilt sensors 6e referring to the common reference state based on the first tilt information, acquired by the first acquisition portion 702e, about the first tilt sensors 6e. The example of the present embodiment identifies the second difference for the set of first tilt sensor 611 and first tilt sensor 612, the set of first tilt sensor 611 and first tilt sensor 613, the set of first tilt sensor 611 and first tilt sensor 614, the set of first tilt sensor 612 and first tilt sensor 613, the set of first tilt sensor 612 and first tilt sensor 614, and the set of first tilt sensor 613 and first tilt sensor 614.

The first defect detection portion 710e detects a defect of the first tilt sensor 6e or the external camera 404 when the second difference identification portion 709e identifies that at least one of the second differences among multiple sets of the first tilt sensor 6e does not fall inside the second allowable range described above. The defect of the external camera 4 includes a tilt of the external camera 4 from the initial position. The first defect detection portion 710e detects a defect of the first tilt sensor 6e or the peripheral monitoring sensor provided with the first tilt sensor 6e that is always included in the set causing the second difference to fall outside the second allowable range.

Suppose the first defect detection portion 710c identifies and detects the defect of each first tilt sensor 6e or peripheral monitoring sensor. Then, the HCU 11 may be notified of this event and may allow the presentation device 12 to provide the relevant information. This makes it easy to take action against defects of the peripheral monitoring sensor.

Similar to the third embodiment, the third difference identification portion 711 according to the sixth embodiment identifies the third difference, a tilt difference between the multiple second tilt sensors 8e referring to the common reference state, based on the second tilt information, acquired by the second acquisition portion 703e, about multiple second tilt sensors 8e. The example of the present embodiment identifies the third difference in the set of second tilt sensors 801 and 802.

Similar to the first difference identification portion 704b, the first difference identification portion 704e may identify the first difference, a difference between the tilt of the moving object and the tilt of the sensor PKG housing 3 referring to the common reference state based on the first tilt information acquired by the first acquisition portion 702e and the second tilt information acquired by the second acquisition portion 703e. The process in the first difference identification portion 704e is also comparable to the first difference identification step.

Similar to the tilt detection portion 705b, the tilt detection portion 705e may detect that the sensor PKG housing 3 tilts from the initial position when the second difference identified by the second difference identification portion 709e falls inside the second allowable range, the third difference identified by the third difference identification portion 711 falls inside the third allowable range, and the first difference identified by the first difference identification portion 704e does not fall inside the first allowable range.

Tilt Detection Process in the Processing Portion 71E

Figure 21:
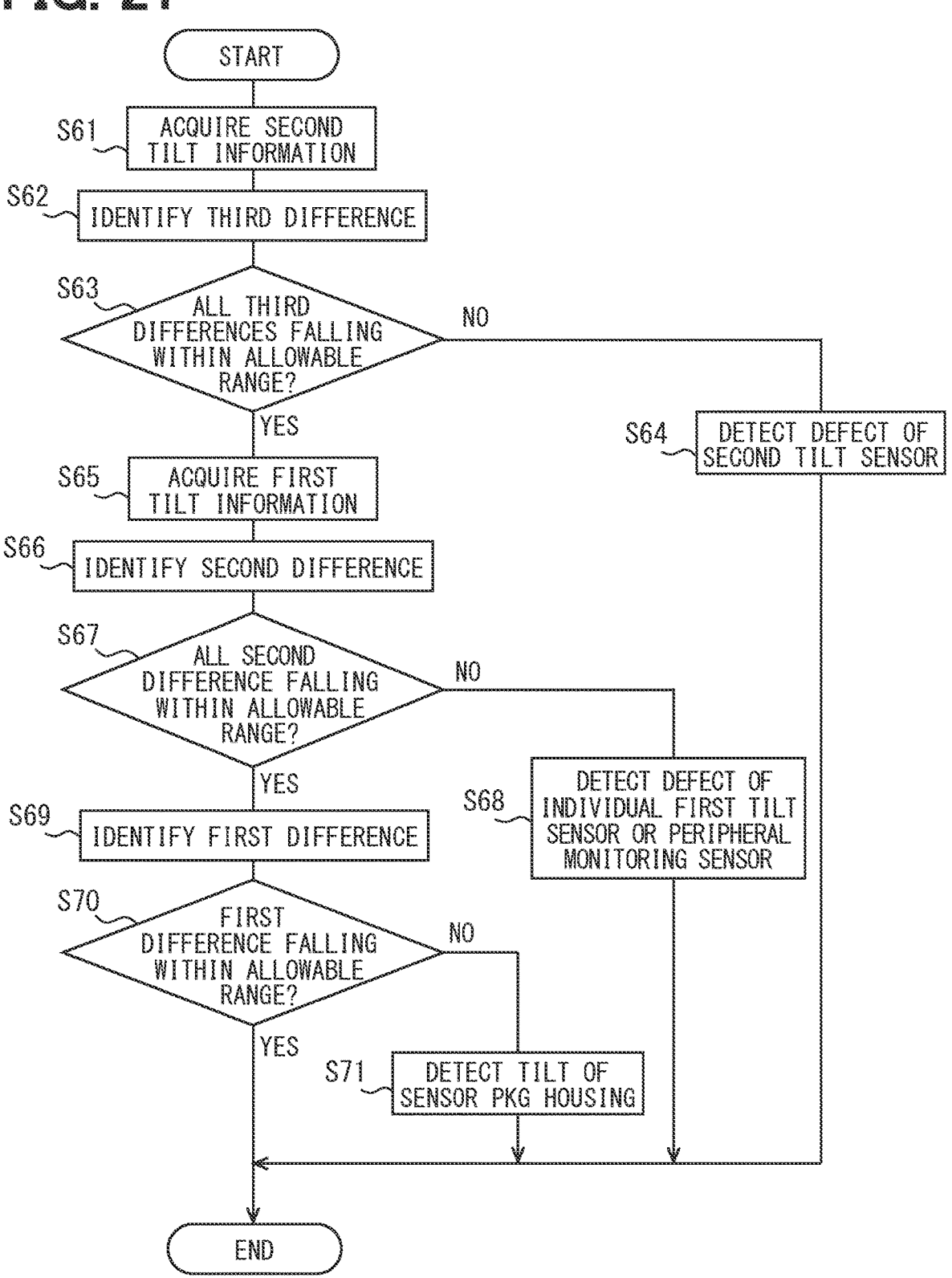
FIG. 21 is a flowchart illustrating the flow of a tilt detection process in a processing portion.

The description below explains an example of the tilt detection process in the processing portion 71e by reference to the flowchart in FIG. 21. The flowchart in FIG. 21 may start under conditions similar to those of the flowchart in FIG. 5.

At step S61, the second acquisition portion 703e acquires the second tilt information detected by each of the second tilt sensors 8e. At step S62, the third difference identification portion 711 identifies the third difference, a tilt difference between the second tilt sensors 8e referring to the common reference state, based on the second tilt information, acquired at S61, about the multiple second tilt sensors 8e.

At step S63, the third difference identified at S62 may fall inside the third allowable range (YES at S63). Then, the process proceeds to step S65. The third difference identified at S62 does not fall inside the third allowable range (NO at S63). Then, the process proceeds to step S64. At step S64, the second defect detection portion 712 detects a defect of the second tilt sensor 8e. Then, the tilt detection process terminates.

At step S65, the first acquisition portion 702e acquires the first tilt information detected from each of the multiple first tilt sensors 6e. At step S66, the second difference identification portion 709e identifies the second difference for each combination of the first tilt sensors 6e based on the first tilt information, acquired at S65, about the multiple first tilt sensors 6e. The second difference is a tilt difference between the first tilt sensors 6e referring to the common reference state.

At step S67, all the second differences in the sets identified at S66 may fall inside the second allowable range (YES in S67). Then, the process proceeds to step S69. None of the sets of second differences identified at S66 may fall inside the second allowable range (NO in S67). Then, the process proceeds to step S68. At step S68, the first defect detection portion 710e detects which of the first tilt sensors 6e or peripheral monitoring sensors causes a defect, based on which set of first tilt sensors 6e causes the second difference to fall outside the second allowable range. Then, the tilt detection process terminates.

At step S69, the first difference identification portion 704e identifies the first difference based on the second tilt information acquired at S61 and the first tilt information acquired at S65. The first difference represents a difference between the tilt of the moving object and the tilt of sensor PKG housing 3 referring to the common reference state.

At step S70, the first difference identified at S69 may fall inside the first allowable range (YES at S70). Then, the tilt detection process terminates. In this case, the tilt detection portion 705e may detect that the sensor PKG housing 3 does not tilt from the initial position. The first difference identified at S69 does not fall inside the first allowable range (NO at S70). Then, the process proceeds to step S71. At step S71, the tilt detection portion 705e detects that the sensor PKG housing 3 tilts from the initial position, and performs the tilt detection process.

Overview of the Sixth Embodiment

The sixth embodiment also detects that the sensor PKG housing 3 tilts from the initial position when the first difference, a difference between the tilt of the subject vehicle and the tilt of the sensor PKG housing 3 referring to the common reference state, does not fall inside the first allowable range. Similar to the first embodiment, it is possible to highly accurately detect the tilt of the sensor PKG housing 3, mounted on the subject vehicle, from the initial position.

The sixth embodiment has described the example of using four first tilt sensors 6e. However, the present disclosure is not necessarily limited thereto. For example, the configuration is not limited to the use of four first tilt sensors 6e. The sixth embodiment has described the example of using two second tilt sensors 8e. However, the present disclosure is not necessarily limited thereto. For example, it may be favorable to detect defects of individual second tilt sensors 8e through the use of three or more second tilt sensors 8e. It may be favorable to combine the configuration of the sixth embodiment and the configuration of the second embodiment.

Seventh Embodiment

As above, the sixth embodiment describes the configuration in which the first tilt sensor 6 is provided only for the peripheral monitoring sensor included in the sensor PKG housing 3. There may also be a configuration (seventh embodiment) in which the first tilt sensor 6 is provided for the peripheral monitoring sensor included in the sensor PKG housing 3 and elsewhere except the peripheral monitoring sensor. The description below explains the configuration according to the seventh embodiment. For convenience sake, the seventh embodiment denotes the first tilt sensor 6 as a first tilt sensor 6f and the second tilt sensor 8 as a second tilt sensor 8f.

Schematic Configuration of the Vehicular System 1f

Figure 22:
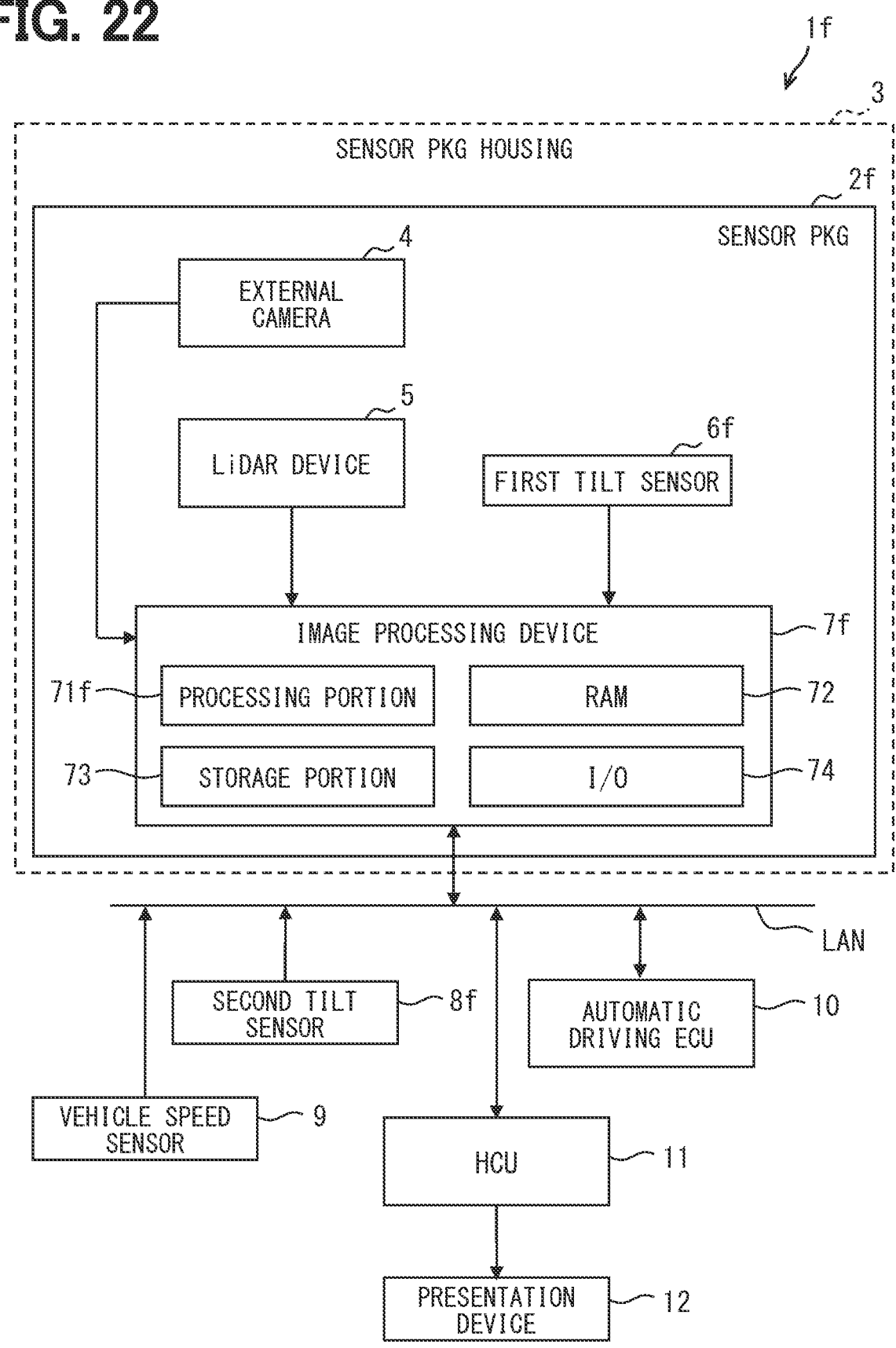
FIG. 22 is a diagram illustrating a schematic configuration of a vehicle system.

The vehicular system 1f can be used for vehicles. As illustrated in FIG. 22, a vehicular system 1f includes a sensor PKG 2f, a second tilt sensor 8f, the vehicle speed sensor 9, the automatic driving ECU 10, the HCU 11, and the presentation device 12. The vehicular system 1f is similar to the vehicular system 1 according to the first embodiment except that the sensor PKG 2f is included instead of the sensor PKG 2 and the second tilt sensor 8f is included instead of the second tilt sensor 8.

It may be favorable to use one or more second tilt sensors 8f. The present embodiment will be described through the use of two second tilt sensors 8b similar to the third embodiment. As illustrated in FIG. 22, the sensor PKG 2f includes the external camera 4, the LiDAR device 5, a first tilt sensor 6f, and an image processing device 7f. The sensor PKG 2f is similar to the sensor PKG 2 according to the first embodiment except that the first tilt sensor 6f and the image processing device 7f are included instead of the first tilt sensor 6 and the image processing device 7. A schematic configuration of the image processing device 7f will be described later. The first tilt sensor 6f is similar to the first tilt sensor 6e according to the sixth embodiment except that the first tilt sensor 6f is provided not only to the peripheral monitoring sensor included in the sensor PKG housing 3 but also to a part other than the same peripheral monitoring sensor. A configuration including the sensor PKG 2f and the second tilt sensor 8b also corresponds to the tilt detection system.

Figure 23:
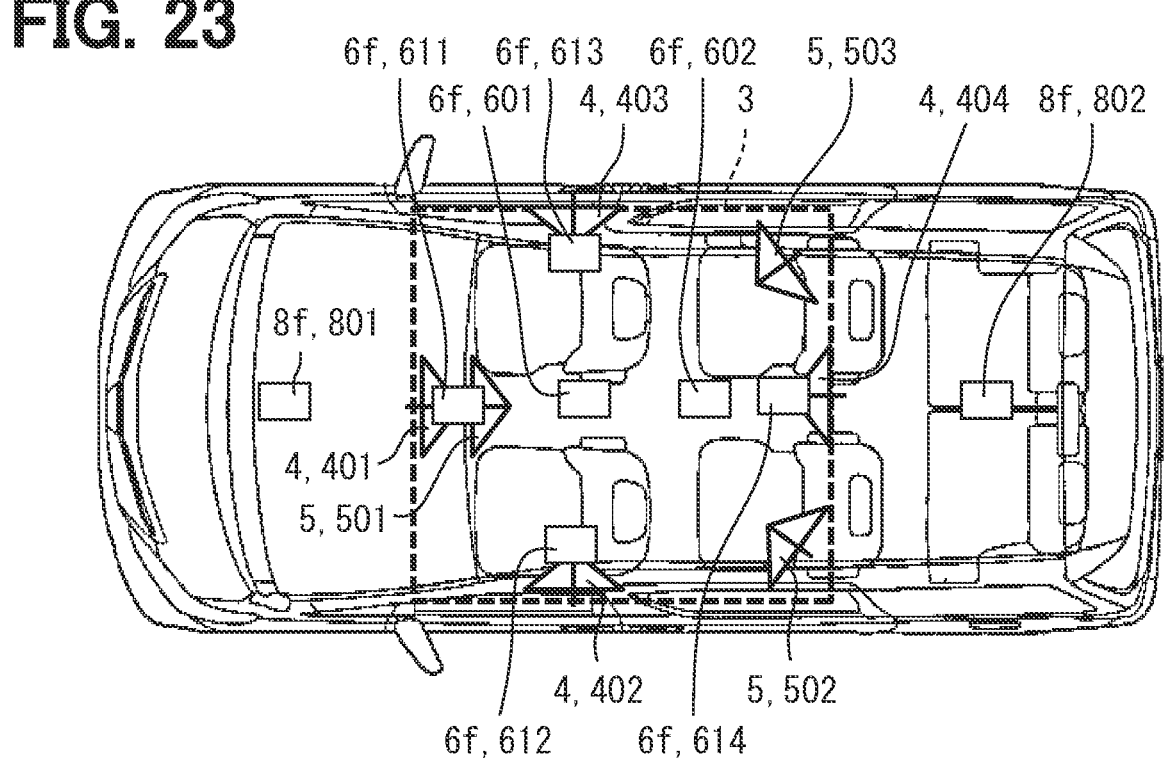
FIG. 23 is a diagram illustrating an arrangement of the external camera, the LiDAR device, a first tilt sensor, and a second tilt sensor according to a seventh embodiment.

By reference to FIG. 23, the description below explains an arrangement of the external camera 4, the LiDAR device 5, the first tilt sensor 6f, and the second tilt sensor 8f according to the seventh embodiment. As above, the sensor PKG housing 3 is assumed to have an approximately rectangular shape along the top surface of the roof of the subject vehicle. The placement of the external camera 4 and the LiDAR device 5 is similar to that described in the first embodiment by reference to FIG. 2.

The first tilt sensor 6*f* is provided for each of the external cameras 4 included in the sensor PKG housing 3 similarly to the first tilt sensor 6*e* according to the sixth embodiment. The four first tilt sensors 6*f* provided for each external camera 4 are placed similarly to the first tilt sensor 6*e* and are hereinafter referred to as first tilt sensors 611, 612, 613, and 614. The first tilt sensor 6*f* is also provided for a part other than the peripheral monitoring sensor of the sensor PKG housing 3. The first tilt sensor 6*f* is assumed to be provided for a position similar to that of the first tilt sensor 6*b* according to the third embodiment. The two first tilt sensors 6*f* provided for a part other than the peripheral monitoring sensor of the sensor PKG housing 3 are placed similarly to the first tilt sensor 6*b* and are hereinafter referred to as first tilt sensors 601 and 602. The first tilt sensor 6*f* may be provided for each of the peripheral monitoring sensors included in the sensor PKG housing 3.

The two second tilt sensors 8*ef* are provided for the subject vehicle except for the sensor PKG housing 3. The two second tilt sensors 8*f* are placed similarly to the second tilt sensor 8*b* and are hereinafter referred to as second tilt sensor 801 and second tilt sensor 802.

Schematic Configuration of the Image Processing Device 7F

The description below explains the schematic configuration of the image processing device 7*f* by reference to FIGS. 22 and 24. As illustrated in FIG. 22, the image processing device 7*f* is an electronic control device that is mainly composed of an arithmetic circuit including a processing portion 71*f*, RAM 72, the storage portion 73, and the I/O 74. The image processing device 7*f* is similar to the image processing device 7*e* according to the sixth embodiment except that the processing portion 71*f* is provided instead of the processing portion 71*e*.

Figure 24:
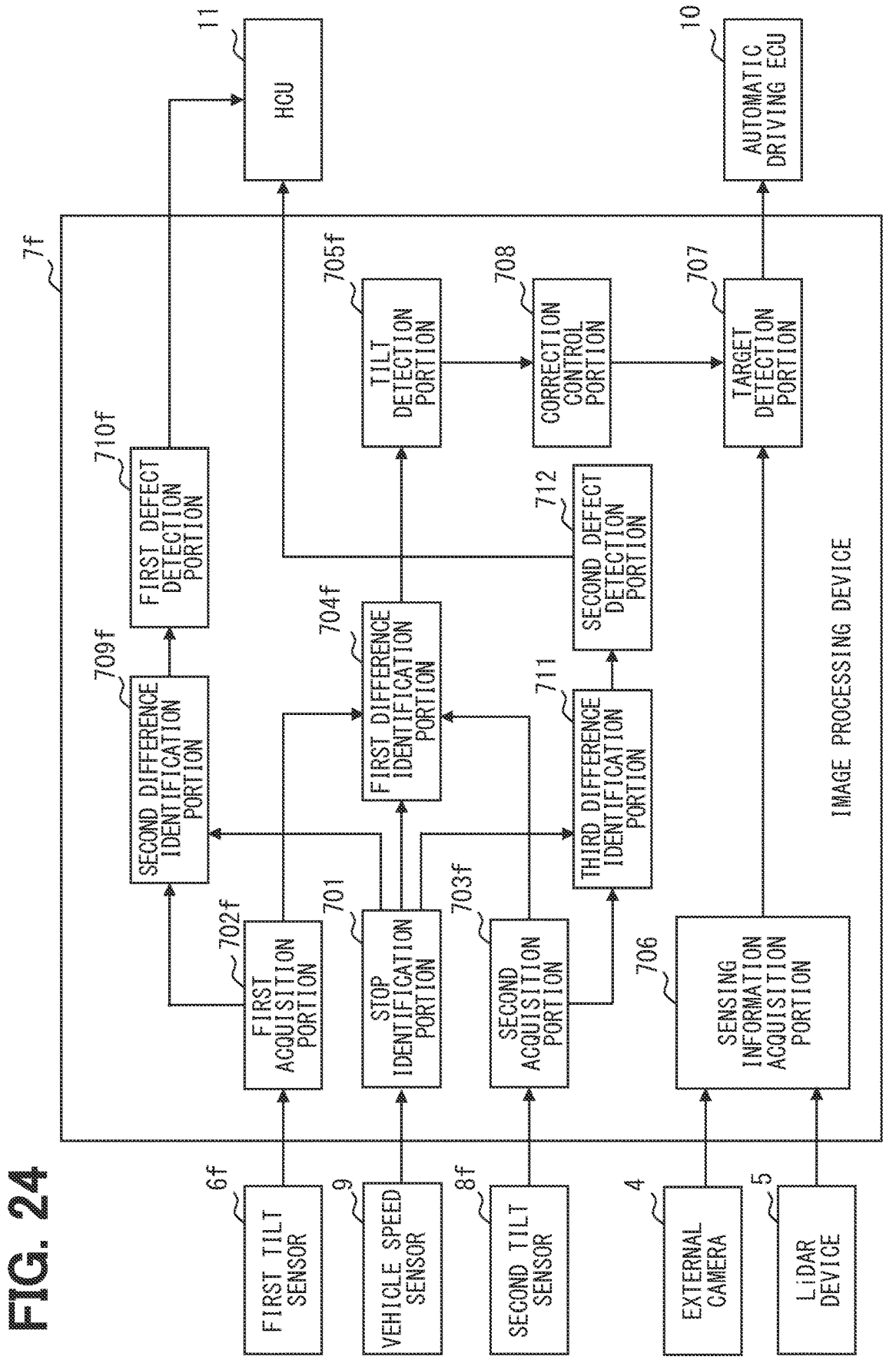
FIG. 24 is a diagram illustrating a schematic configuration of an image processing device.

As illustrated in FIG. 24, the image processing device 7*f* includes functional blocks such as the stop identification portion 701, a first acquisition portion 702*f*, a second acquisition portion 703*f*, a first difference identification portion 704*f*, a tilt detection portion 705*f*, the sensing information acquisition portion 706, the target detection portion 707, the correction control portion 708, a second difference identification portion 709*f*, a first defect detection portion 710*f*, a third difference identification portion 711 and a second defect detection portion 712. The image processing device 7*f* is also comparable to the tilt detection device. The computer executes processes of the functional blocks of the image processing device 7*f*. This is also comparable to the execution of the tilt detection method. The functional blocks of the image processing device 7*f* are similar to those of the image processing device 7*e* according to the sixth embodiment except that the first acquisition portion 702*f*, the second acquisition portion 703*f*, the first difference identification portion 704*f*, the tilt detection portion 705*f*, and second difference identification portion 709*f* are provided instead of the first acquisition portion 702*e*, the second acquisition portion 703*e*, the first difference identification portion 704*e*, the tilt detection portion 705*e*.

The first acquisition portion 702*f* acquires the first tilt information detected by the multiple first tilt sensors 6*f*. The example according to the present embodiment acquires the first tilt information from the first tilt sensors 601, 602, 611, 612, 613, and 614. The process in the first acquisition portion 702*f* is also comparable to a first acquisition step. The second acquisition portion 703*f* acquires the second tilt information detected by the multiple second tilt sensors 8*f*. The example according to the present embodiment acquires the second tilt information from the second tilt sensors 801 and 802. The process in the second acquisition portion 703*e* is also comparable to a second acquisition step.

Similar to the second difference identification portion 709, the second difference identification portion 709*f* identifies the second difference, a tilt difference among the multiple first tilt sensors 6*f* referring to the common reference state based on the first tilt information, acquired by the first acquisition portion 702*f*, about the multiple first tilt sensors 6*f*. The second difference identification portion 709*f* preferably identifies the second difference between the first tilt sensors 6*f* not provided for the peripheral monitoring sensor, and the second difference between the first tilt sensors 6*f* provided for the peripheral monitoring sensor. The example of the present embodiment identifies the second difference for the set of first tilt sensors 601 and 602 out of the first tilt sensors 6*f* not provided for the peripheral monitoring sensor. The first tilt sensors 6*f* provided for the peripheral monitoring sensor includes the set of first tilt sensors 611 and 612, the set of first tilt sensors 611 and 613, and the set of first tilt sensors 611 and 614, the set of first tilt sensors 612 and 613, the set of first tilt sensors 612 and 614, and the set of first tilt sensors 613 and 614.

Similar to the first defect detection portion 710 according to the third embodiment, the first defect detection portion 710*f* detects defect of the first tilt sensor 6*f* not provided for the peripheral monitoring sensor when the second difference identification portion 709*f* identifies the second difference to fall outside the above-described second allowable range in terms of the set of first tilt sensors 6*f* not provided for the peripheral monitoring sensor.

Similar to the first defect detection portion 710*e* according to the sixth embodiment, the first defect detection portion 710*f* detects defect of the first tilt sensor 6*f* provided for the peripheral monitoring sensor or defect of the peripheral monitoring sensor when the second difference identification portion 709*f* identifies the second difference to fall outside the above-described second allowable range in terms of any set of first tilt sensors 6*f* provided for the peripheral monitoring sensor. The example of the present embodiment detects a defect of the external camera 4.

Similar to the third embodiment, the third difference identification portion 711 according to the seventh embodiment identifies the third difference, a tilt difference between the multiple second tilt sensors 8*f* referring to the common reference state, based on the second tilt information, acquired by the second acquisition portion 703*f*, about multiple second tilt sensors 8*f*. The example of the present embodiment identifies the third difference in the set of second tilt sensors 801 and 802.

Similar to the first difference identification portion 704*b*, the first difference identification portion 704*f* may identify the first difference, a difference between the tilt of the moving object and the tilt of the sensor PKG housing 3 referring to the common reference state based on the first tilt information acquired by the first acquisition portion 702*f* and the second tilt information acquired by the second acquisition portion 703*f*. For example, the first difference identification portion 704*f* may identify the first difference to be a difference between the average of tilts of the multiple first tilt sensors 6*f* and the average of tilts of the multiple second tilt sensor 8*f*. The first tilt sensors 6*f* include those provided for the peripheral monitoring sensor and those not provided for same. The process in the first difference identification portion 704*f* is also comparable to the first difference identification step.

Similar to the tilt detection portion 705*b*, the tilt detection portion 705*f* may detect that the sensor PKG housing 3 tilts from the initial position when the second difference identified by the second difference identification portion 709f falls inside the second allowable range, the third difference identified by the third difference identification portion 711 falls inside the third allowable range, and the first difference identified by the first difference identification portion 704f does not fall inside the first allowable range.

Tilt Detection Process in the Processing Portion 71F

Figure 25:
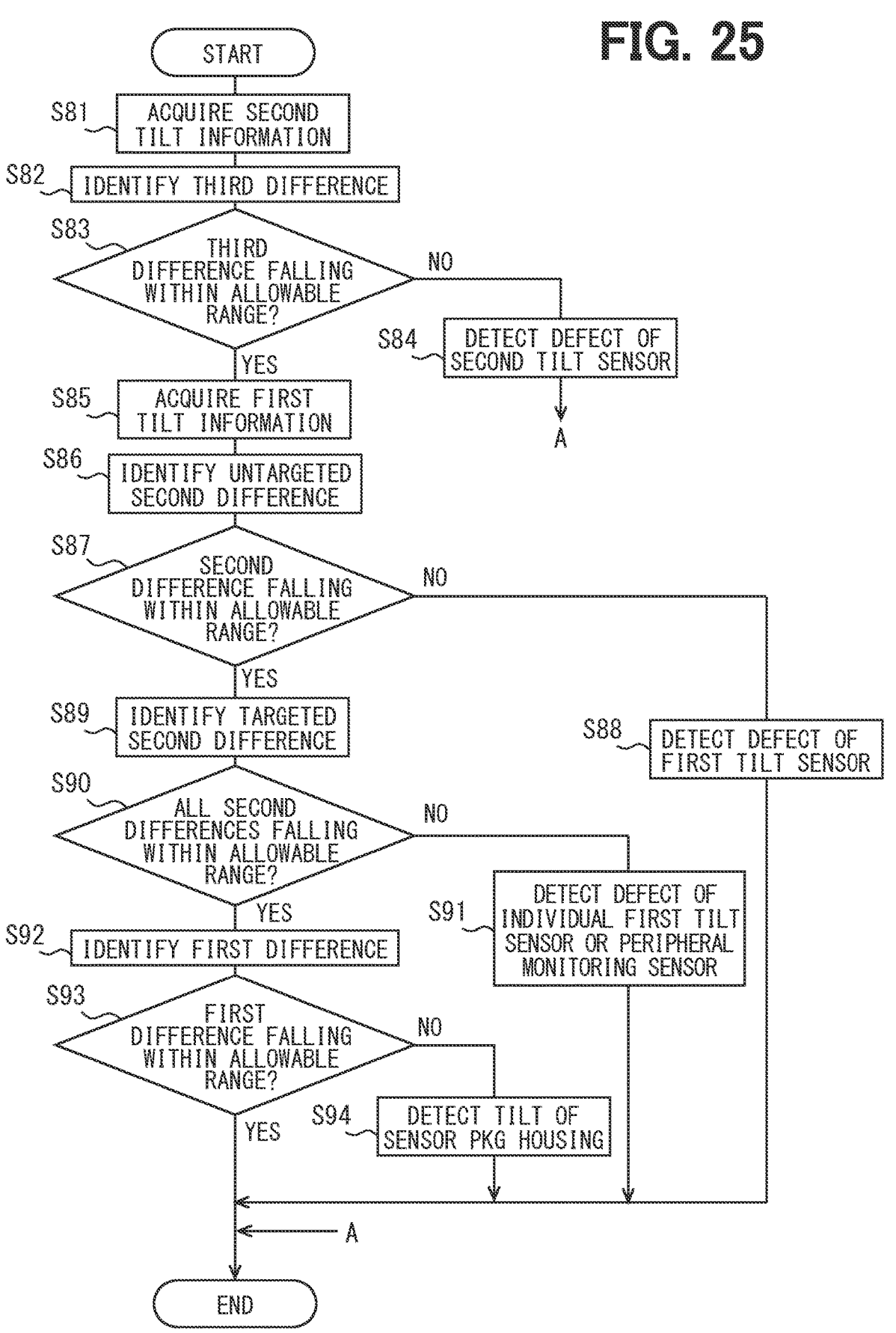
FIG. 25 is a flowchart illustrating the flow of a tilt detection process in a processing portion.

The description below explains an example of the tilt detection process in the processing portion 71f by reference to the flowchart in FIG. 25. The flowchart in FIG. 25 may start under conditions similar to those of the flowchart in FIG. 5.

At step S81, the second acquisition portion 703f acquires the second tilt information detected by each of the second tilt sensors 8f. At step S82, the third difference identification portion 711 identifies the third difference, a tilt difference among the second tilt sensors 8f referring to the common reference state, based on the second tilt information about the multiple second tilt sensors 8f acquired at S81.

At step S83, the third difference identified at S82 may fall inside the third allowable range (YES at S83). Then, the process proceeds to step S85. The third difference identified at S82 may not fall inside the third allowable range (NO at S83). Then, the process proceeds to step S84. At step S84, the second defect detection portion 712 detects a defect of the second tilt sensor 8f. Then, the tilt detection process terminates.

At step S85, the first acquisition portion 702f acquires the first tilt information detected by each of the first tilt sensors 6f. At step S86, the second difference identification portion 709f identifies the second difference based on the first tilt information about multiple first tilt sensors 6f acquired at S85. The second difference denotes a tilt difference among the first tilt sensors 6f not provided for the peripheral monitoring sensor referring to the common reference state. This second difference is referred to as an untargeted second difference.

At step S87, the untargeted second difference identified at S86 may fall inside the second allowable range (YES at S87). Then, the process proceeds to step S89. The untargeted second difference identified at S86 may not fall inside the second allowable range (NO at S87). Then, the process proceeds to step S88. At step S88, the first defect detection portion 710f detects a defect of the first tilt sensor 6f not provided for the peripheral monitoring sensor. Then, the tilt detection process terminates.

At step S89, the second difference identification portion 709f identifies the second difference for each combination of first tilt sensors 6f provided for the peripheral monitoring sensor based on the first tilt information about multiple first tilt sensors 6f acquired at S85. The second difference denotes a tilt difference among the first tilt sensors 6f provided for the peripheral monitoring sensor referring to the common reference state. This second difference is referred to as a targeted second difference.

At step S90, all sets of targeted second differences identified at S89 may fall inside the second allowable range (YES at S90). Then, the process proceeds to step S92. At least one of the targeted second differences identified at S89 may fall outside the second allowable range (NO at S90). Then, the process proceeds to step S91. At step S91, the first defect detection portion 710f detects the defect occurring on which first tilt sensor 6f or which peripheral monitoring sensor including the same first tilt sensor 6f, based on which set of first tilt sensors 6f causes the targeted second difference to fall outside the second allowable range. Then, the tilt detection process terminates.

At step S92, the first difference identification portion 704f identifies the first difference based on the second tilt information acquired at S81 and the first tilt information acquired at S85. The first difference represents a difference between the tilt of the moving object and the tilt of sensor PKG housing 3 referring to the common reference state.

At step S93, the first difference identified at S92 may fall inside the first allowable range (YES at S93). Then, the tilt detection process terminates. In this case, the tilt detection portion 705e may detect that the sensor PKG housing 3 does not tilt from the initial position. The first difference identified at S92 does not fall inside the first allowable range (NO at S93). Then, the process proceeds to step S94. At step S94, the tilt detection portion 705f detects that the sensor PKG housing 3 tilts from the initial position, and performs the tilt detection process.

Overview Of The Seventh Embodiment

The seventh embodiment also detects that the sensor PKG housing 3 tilts from the initial position when the first difference, a difference between the tilt of the subject vehicle and the tilt of the sensor PKG housing 3 referring to the common reference state, does not fall inside the first allowable range. Similar to the first embodiment, it is possible to highly accurately detect the tilt of the sensor PKG housing 3, mounted on the subject vehicle, from the initial position.

The seventh embodiment has described the example of using two first tilt sensors 6f not provided for the peripheral monitoring sensor. However, the present disclosure is not necessarily limited thereto. In other words, the number of first tilt sensors 6f not provided for the peripheral monitoring sensor is not limited to two. For example, it may be also favorable to use three or more first tilt sensors 6f not provided for the peripheral monitoring sensor and enable detection of individual defects of the first tilt sensors 6f not provided for the peripheral monitoring sensor.

The seventh embodiment has described the example of using two second tilt sensors 8f. However, the present disclosure is not necessarily limited thereto. For example, it may be favorable to detect defects of individual second tilt sensors 8f through the use of three or more second tilt sensors 8f. It may be favorable to combine the configuration of the seventh embodiment and the configuration of the second embodiment.

Eighth Embodiment

According to the above-described embodiments, the image processing devices 7, 7a, 7b, 7c, 7d, 7e, and 7f include the correction control portion 708. However, the present disclosure is not necessarily limited thereto. For example, the image processing devices 7, 7a, 7b, 7c, 7d, 7e, and 7f may not include the correction control portion 708.

Ninth Embodiment

According to the above-described embodiments, the image processing devices 7, 7a, 7b, 7c, 7d, 7e, and 7f include the stop identification portion 701. However, the present disclosure is not necessarily limited thereto. For example, the image processing devices 7, 7a, 7b, 7c, 7d, 7e, and 7f may not include the stop identification portion 701.

Tenth Embodiment

According to the above-described embodiments, multiple external cameras 4 and multiple LiDAR devices 5 are used as peripheral monitoring sensors. However, the present disclosure is not necessarily limited thereto. For example, it may be favorable to use at least one external camera 4 or one LiDAR device 5.

Eleventh Embodiment

The above-described embodiments have explained the configuration of using two types of peripheral monitoring sensors such as the external camera 4 and the LiDAR device 5. However, the present disclosure is not necessarily limited thereto. For example, only the external camera 4 or the LiDAR device 5 may be used. It may be favorable to use other types of peripheral monitoring sensors other than the external camera 4 and the LiDAR device 5. It may be favorable to use three or more types of peripheral monitoring sensors.

Twelfth Embodiment

The above-described embodiments have explained the examples of using the sensor PKGs 2, 2a, 2c, 2d, 2e, and 2f and the image processing device 7a for vehicles. However, the present disclosure is not necessarily limited thereto. For example, these devices may be used for moving bodies other than vehicles. The moving objects other than vehicles may include drones, for example.

The present disclosure is not limited to the above-described embodiments but various modifications may be made within the scope of the appended claims. The technical scope of the present disclosure also covers an embodiment acquired by appropriately combining the technical arrangements disclosed in the different embodiments. The control portion and the method thereof described in the present disclosure may be provided by a dedicated computer configuring a processor that is programmed to perform one or more functions embodied by a computer program. Alternatively, the apparatus and the method thereof described in the present disclosure may be provided by a dedicated hardware logic circuit. Moreover, the apparatus and the method thereof described in the present disclosure may be provided by one or more dedicated computers configured by a combination of a processor to execute computer programs and one or more hardware logic circuits. The computer program as an instruction executed by the computer may be stored in a computer-readable non-transitory tangible storage medium.

The invention claimed is:

1. A tilt detection device for a moving object, comprising:

a processor;

a non-transitory computer-readable storage medium; and a set of computer-executable instructions stored on the non-transitory computer-readable storage medium that cause the processor to:

acquire first tilt information detected by a first tilt sensor disposed in a sensor package housing that is mounted in the moving object and includes a peripheral monitoring sensor used to monitor surroundings of the moving object;

acquire second tilt information detected by a second tilt sensor disposed in a portion of the moving object other than the sensor package housing;

identify a first difference between a tilt of the moving object relative to a common reference state and a tilt of the sensor package housing relative to the common reference state based on the first tilt information and the second tilt information; and determine that the sensor package housing is tilted from an initial position when the first difference that is identified does not fall within a first allowable range, the set of computer-executable instructions further cause the processor to correct a sensing deviation corresponding to the first difference that is identified when the sensor package housing is determined to be tilted from the initial position.

2. The tilt detection device according to claim 1, wherein the set of computer-executable instructions further cause the processor to:

identify the first difference based on the first tilt information and the second tilt information;

acquire the first tilt information when the moving object stops; and acquire the second tilt information when the moving object stops.

3. A tilt detection system, comprising:

a tilt detection device, which is usable in a moving object, comprising:

a processor;

a non-transitory computer-readable storage medium; and a set of computer-executable instructions stored on the non-transitory computer-readable storage medium that cause the processor to:

acquire first tilt information detected by a first tilt sensor disposed in a sensor package housing that is mounted in the moving object and includes a peripheral monitoring sensor used to monitor surroundings of the moving object;

acquire second tilt information detected by a second tilt sensor disposed in a portion of the moving object other than the sensor package housing;

identify a first difference between a tilt of the moving object relative to a common reference state and a tilt of the sensor package housing relative to the common reference state based on the first tilt information and the second tilt information; and determine that the sensor package housing is tilted from an initial position when the first difference that is identified does not fall within a first allowable range, wherein the sensor package housing that is mounted in the moving object and includes the peripheral monitoring sensor used to monitor surroundings of the moving object;

the first tilt sensor that is disposed in the sensor package housing; and the second tilt sensor that is disposed in the portion of the moving object other than the sensor package housing, wherein the first tilt sensor includes a plurality of first tilt sensors disposed in the sensor package housing, the set of computer-executable instructions further cause the processor to:

acquire the first tilt information detected by each of the plurality of first tilt sensors, identify a second difference that is a tilt difference between tilts of the plurality of first tilt sensors relative to a common reference state based on the first tilt information that is acquired from each of the plurality of first tilt sensors;

detect a defect in at least one of the plurality of first tilt sensors when the second difference that is identified does not fall within a second allowable range; and determine that the sensor package housing is tilted from the initial position when the second difference that is identified falls within the second allowable range and when the first difference that is identified does not fall within the first allowable range.

4. The tilt detection system according to claim 3, wherein the tilt detection device is included in the sensor package housing.

5. The tilt detection system according to claim 3, wherein the tilt detection device is not included in the sensor package housing.

6. The tilt detection system according to claim 4, wherein the moving object is a vehicle, the first tilt sensor includes two first tilt sensors, the second tilt sensor includes one or two second tilt sensor; and the two first tilt sensors and the one or two second tilt sensor are arranged along a longitudinal axis or a lateral axis of the vehicle.

7. The tilt detection system according to claim 4, wherein the moving object is a vehicle, and the first tilt sensor includes a plurality of first tilt sensors, the sensor package housing includes a front wheel side region and a rear wheel side region, and at least one of the plurality of first tilt sensors is disposed in each of the front wheel side region and the rear wheel side region.

8. The tilt detection system according to claim 4, wherein the first tilt sensor includes three or more first tilt sensors, the set of computer-executable instructions further cause the processor to:

identify a plurality of second differences between the three or more first tilt sensors; and determine which sensor among the three or more first tilt sensors has a defect by identifying one of the plurality of second differences falling outside of the second allowable range.

9. The tilt detection system according to claim 8, wherein the moving object is a vehicle, the first tilt sensor includes four or more first tilt sensors, the sensor package housing includes a right front wheel side region, a left front wheel side region, a right rear wheel side region, and a left rear wheel side region, and at least one of the four or more first tilt sensors is disposed in each of the right front wheel side region, the left front wheel side region, the right rear wheel side region, and the left rear wheel side region.

10. The tilt detection system according to claim 4, wherein the peripheral monitoring sensor includes three or more peripheral monitoring sensors included in the sensor package housing, the first tilt sensor includes four or more first tilt sensors, at least one of the four or more first tilt sensors is disposed in each of the three or more peripheral monitoring sensors, the set of computer-executable instructions further cause the processor to:

identify a plurality of second differences between the three or more first tilt sensors; and determine which sensor among the four or more first tilt sensors or the three or more peripheral monitoring sensors has a defect by identifying one of the plurality of second differences not falling within the second allowable range.

11. A tilt detection system, comprising:

a tilt detection device, which is usable in a moving object, comprising:

a processor;

a non-transitory computer-readable storage medium; and a set of computer-executable instructions stored on the non-transitory computer-readable storage medium that cause the processor to:

acquire first tilt information detected by a first tilt sensor disposed in a sensor package housing that is mounted in the moving object and includes a peripheral monitoring sensor used to monitor surroundings of the moving object;

acquire second tilt information detected by a second tilt sensor disposed in a portion of the moving object other than the sensor package housing;

identify a first difference between a tilt of the moving object relative to a common reference state and a tilt of the sensor package housing relative to the common reference state based on the first tilt information and the second tilt information; and determine that the sensor package housing is tilted from an initial position when the first difference that is identified does not fall within a first allowable range, wherein the sensor package housing that is mounted in the moving object and includes the peripheral monitoring sensor used to monitor surroundings of the moving object;

the first tilt sensor that is disposed in the sensor package housing; and the second tilt sensor that is disposed in the portion of the moving object other than the sensor package housing, wherein the second tilt sensor includes a plurality of second tilt sensors that are disposed in the portion of the moving object other than the sensor package housing, wherein the set of computer-executable instructions further cause the processor to:

acquire the second tilt information detected by each of the plurality of second tilt sensors, identify a third difference that is a difference between tilts of the plurality of second tilt sensors relative to the common reference state based on the second tilt information that is acquired from each of the plurality of second tilt sensors;

detect a defect in at least one of the plurality of second tilt sensors when the third difference that is identified does not fall within a third allowable range; and determine that the sensor package housing is tilted from the initial position when the third difference that is identified falls within the third allowable range and when the first difference that is identified does not fall within the first allowable range.

12. The tilt detection system according to claim 11, wherein the moving object is a vehicle, and the second tilt sensor includes two second tilt sensors, the first tilt sensor includes one or two first tilt sensor, and the two second tilt sensors and the one or two first tilt sensor are arranged along a longitudinal axis or a lateral axis of the vehicle.

13. The tilt detection system according to claim 11, wherein the moving object is a vehicle, the second tilt sensor includes a plurality of second tilt sensors, the vehicle includes a front wheel side region and a rear wheel side region, and at least one of the plurality of second tilt sensors is disposed in each of the front wheel side region and the rear wheel side region.

14. The tilt detection system according to claim 11, wherein the second tilt sensor includes three or more second tilt sensors, the set of computer-executable instructions further cause the processor to:

identify a plurality of third differences between the three or more second tilt sensors; and determine which sensor among the plurality of second tilt sensors has a defect by identifying one of the plurality of third differences not falling within the third allowable range.

15. The tilt detection system according to claim 14, wherein the moving object is a vehicle, the second tilt sensor includes four or more second tilt sensors, the vehicle includes a right front wheel side region, a left front wheel side region, a right rear wheel side region, and a left rear wheel side region, and at least one of the four or more second tilt sensors is disposed in each of the right front wheel side region, the left front wheel side region, the right rear wheel side region, and the left rear wheel side region.

16. A tilt detection method implemented by at least one processor of a moving object, the method comprising:

acquiring first tilt information detected by a first tilt sensor disposed in a sensor package housing that is mounted in the moving object and includes a peripheral monitoring sensor used to monitor surroundings of the moving object;

acquiring second tilt information detected by a second tilt sensor disposed in a portion of the moving object other than the sensor package housing;

identifying a first difference between a tilt of the moving object relative to a common reference state and a tilt of the sensor package housing relative to the common reference state based on the acquired first tilt information and the acquired second tilt information;

determining that the sensor package housing is tilted from an initial position when the identified first difference does not fall within a first allowable range; and correcting a sensing deviation corresponding to the first difference that is identified when the sensor package housing is determined to be tilted from the initial position.

17. A non-transitory, computer readable, tangible storage medium for storing a tilt detection program for a moving object, the tilt detection program comprising instructions, when executed by at least one processor of the moving object, causing the at least one processor to:

acquire first tilt information detected by a first tilt sensor disposed in a sensor package housing that is mounted in the moving object and includes a peripheral monitoring sensor used to monitor surroundings of the moving object;

acquire second tilt information detected by a second tilt sensor disposed in a portion of the moving object other than the sensor package housing;

identify a first difference between a tilt of the moving object relative to a common reference state and a tilt of the sensor package housing relative to the common reference state based on the acquired first tilt information and the acquired second tilt information;

determine that the sensor package housing is tilted from an initial position when the identified first difference does not fall within a first allowable range, and correct a sensing deviation corresponding to the first difference that is identified when the sensor package housing is determined to be tilted from the initial position.

* * * * *